(12) United States Patent
Saunders et al.

(10) Patent No.: US 10,345,038 B2
(45) Date of Patent: Jul. 9, 2019

(54) DYNAMIC COEFFICIENT OF PERFORMANCE CALCULATION FOR REFRIGERATION SYSTEMS

(71) Applicant: Emerson Climate Technologies Retail Solutions, Inc., Kennesaw, GA (US)

(72) Inventors: Michael A. Saunders, Sidney, OH (US); Rajan Rajendran, Centerville, OH (US); John Wallace, Acworth, GA (US)

(73) Assignee: Emerson Climate Technologies Retail Solutions, Inc., Kennesaw, GA (US)

( * ) Notice: Subject to any disclaimer, the term of this patent is extended or adjusted under 35 U.S.C. 154(b) by 0 days.

(21) Appl. No.: 15/961,323

(22) Filed: Apr. 24, 2018

(65) Prior Publication Data

US 2018/0306491 A1    Oct. 25, 2018

Related U.S. Application Data

(60) Provisional application No. 62/489,856, filed on Apr. 25, 2017.

(51) Int. Cl.
*G01L 3/26* (2006.01)
*F25B 49/00* (2006.01)
(Continued)

(52) U.S. Cl.
CPC ............ *F25D 29/006* (2013.01); *F25B 1/10* (2013.01); *F25B 5/02* (2013.01); *F25B 49/005* (2013.01);
(Continued)

(58) Field of Classification Search
CPC .. F25B 1/10; F25B 2400/22; F25B 2400/075; F25B 2500/19; G01L 3/26
(Continued)

(56) References Cited

U.S. PATENT DOCUMENTS

| 4,768,346 A | 9/1988 | Mathur |
| 8,775,123 B2 | 7/2014 | Bersch et al. |
| 2010/0313586 A1 | 12/2010 | Yakumaru et al. |

FOREIGN PATENT DOCUMENTS

| EP | 0412959 B1 | 2/1993 |
| KR | 100776324 B1 | 11/2007 |

OTHER PUBLICATIONS

International Search Report of the International Searching Authority regarding International Application No. PCT/US2018/029414 dated Aug. 2, 2018.

(Continued)

*Primary Examiner* — John E Breene
*Assistant Examiner* — Jeffrey P Aiello
(74) *Attorney, Agent, or Firm* — Harness, Dickey & Pierce, P.L.C.

(57) ABSTRACT

Systems and methods for performing dynamic coefficient of performance calculations for refrigeration systems are provided. A controller calculates a weighted Carnot efficiency of a refrigeration case based on outdoor temperature data, refrigeration case temperature data, a case load of a refrigeration case, and a case defrost status of the refrigeration case. The controller calculates a weighted coefficient of performance based on based on a refrigerant type, the case load of the refrigeration case, the case defrost status of the refrigeration case, and at least one of the of the refrigeration case temperature data and pressure data. The controller calculates a system performance index (SPI) for the refrigeration case based on the weighted Carnot efficiency of the refrigeration case and weighted actual Carnot efficiency. The controller generates, in response to the SPI being below a threshold, an output indicating that the refrigeration case is operating below a threshold efficiency.

24 Claims, 15 Drawing Sheets

(51) Int. Cl.
- *F25D 29/00* (2006.01)
- *G01M 99/00* (2011.01)
- *F25B 1/10* (2006.01)
- *F25B 5/02* (2006.01)
- *F25B 49/02* (2006.01)

(52) U.S. Cl.
CPC ............... *F25B 49/02* (2013.01); *G01L 3/26* (2013.01); *G01M 99/008* (2013.01); *F25B 2400/075* (2013.01); *F25B 2400/13* (2013.01); *F25B 2400/22* (2013.01); *F25B 2400/23* (2013.01); *F25B 2500/19* (2013.01); *F25B 2600/0251* (2013.01); *F25B 2600/111* (2013.01); *F25B 2700/1931* (2013.01); *F25B 2700/1933* (2013.01); *F25B 2700/2106* (2013.01); *F25B 2700/2117* (2013.01); *F25B 2700/21163* (2013.01); *F25D 2700/00* (2013.01)

(58) Field of Classification Search
USPC .......... 62/126, 127, 129, 276; 702/130, 182, 702/183
See application file for complete search history.

(56) References Cited

OTHER PUBLICATIONS

Written Opinion of the International Search Authority regarding International Application No. PCT/US2018/029414 dated Aug. 2, 2018.

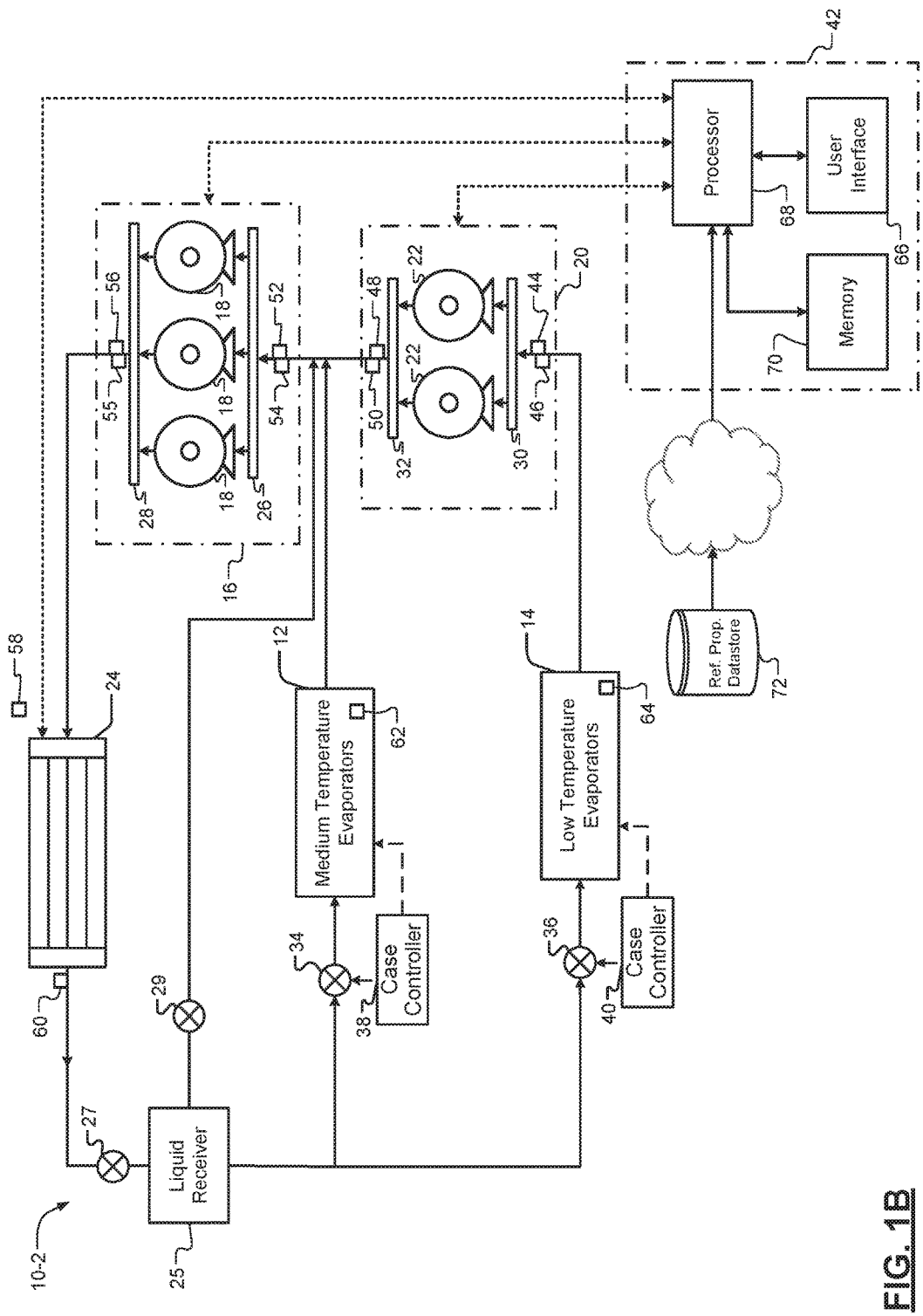

DYNAMIC COEFFICIENT OF PERFORMANCE CALCULATION FOR REFRIGERATION SYSTEMS

CROSS-REFERENCE TO RELATED APPLICATIONS

This application claims the benefit of U.S. Provisional Application No. 62/489,856, filed on Apr. 25, 2017. The entire disclosure of the above application is incorporated herein by reference.

FIELD

The present disclosure relates to systems and methods for dynamic coefficient of performance calculation for refrigeration systems.

BACKGROUND

This section provides background information related to the present disclosure which is not necessarily prior art.

Maintaining a refrigeration system and ensuring that the refrigeration system is operating at peak efficiency requires the refrigeration system to obtain various metrics, such as pressure and temperature values. The refrigeration system may obtain the various metrics using sensors that are integrated into the refrigeration system. However, the various metrics alone may not indicate the performance of the refrigeration system with respect to its theoretical design efficiency.

In order to evaluate the performance of the refrigeration system with respect to its theoretical design efficiency, a coefficient of performance (COP), which is a ratio of cooling provided by the refrigeration system and work required by the refrigeration system, may be used to determine the efficiency. However, calculating the COP requires nonconventional sensors, such as a power meter and a flow meter, which may be difficult and costly to integrate into the refrigeration system.

SUMMARY

This section provides a general summary of the disclosure, and is not a comprehensive disclosure of its full scope or all of its features.

The present disclosure provides systems and methods for performing dynamic coefficient of performance calculations for refrigeration systems.

The present disclosure provides a refrigeration system comprising a refrigeration case that includes an evaporator, a compressor rack associated with the refrigeration case, and a controller. The controller is configured to, using a processor, execute instructions that are stored in a non-transitory memory. The instructions include receiving outdoor temperature data and refrigeration case temperature data from a plurality of temperature sensors, receiving pressure data of the compressor rack from a pressure sensor, calculating a weighted Carnot efficiency of the refrigeration case based on (i) the outdoor temperature data, (ii) the refrigeration case temperature data, (iii) a case load of the refrigeration case, and (iv) a case defrost status of the refrigeration case, calculating a weighted coefficient of performance based on (i) a refrigerant type, (ii) the case load of the refrigeration case, (iii) the case defrost status of the refrigeration case, and at least one of the of (iv) the refrigeration case temperature data and (v) the pressure data, calculating a system performance index (SPI) for the refrigeration case based on the weighted Carnot efficiency of the refrigeration case and weighted actual Carnot efficiency, and generating, in response to the SPI being below a threshold, an output indicating that the refrigeration case is operating below a threshold efficiency.

In some configurations, the instructions include calculating at least one enthalpy for the refrigeration case based on a refrigerant type and at least one of the refrigeration case temperature data and the pressure data.

In some configurations, the at least one enthalpy includes a suction gas enthalpy, a liquid refrigerant enthalpy, and a discharge gas enthalpy.

In some configurations, the suction gas enthalpy is based on the refrigerant type, the suction gas pressure at the refrigeration case, and a suction gas temperature of the compressor.

In some configurations, the liquid refrigerant enthalpy is based on the refrigerant type and a liquid temperature of the refrigerant exiting a condenser of the refrigeration system.

In some configurations, the discharge gas enthalpy is based on the refrigerant type, a discharge pressure, and a discharge temperature.

In some configurations, the instructions include calculating an actual Carnot efficiency based on the at least one enthalpy.

In some configurations, the instructions include calculating a Carnot efficiency based on the outdoor temperature data and the refrigeration case temperature data.

In some configurations, the instructions include calculating an adjusted case load of the evaporator based on the case defrost status of the evaporator and the case load of the evaporator.

In some configurations, the instructions include calculating the weighted Carnot efficiency of the refrigeration case based on a Carnot efficiency of the refrigeration case and an adjusted case load of the evaporator.

In some configurations, the instructions include calculating the weighted coefficient of performance based on an actual Carnot efficiency and an adjusted case load of the evaporator.

In some configurations, the instructions include generating a regression model based on a plurality of SPIs, and, in response to the regression model being below an error threshold at a first instance of time, the instructions include generating an output indicating that the refrigeration case is operating below a threshold efficiency.

In another form, the present disclosure provides a method for calculating an efficiency of a refrigeration case of a refrigeration system. The refrigeration case includes an evaporator, and the refrigeration system includes a compressor rack associated with the refrigeration case. The method includes receiving, using a processor, outdoor temperature data and refrigeration case temperature data from a plurality of temperature sensors. The method also includes receiving, using the processor, pressure data of the compressor rack from a pressure sensor. The method also includes calculating, using the processor and based on instructions stored in a non-transitory memory, a weighted Carnot efficiency of the refrigeration case based on (i) the outdoor temperature data, (ii) the refrigeration case temperature data, (iii) a case load of the refrigeration case, and (iv) a case defrost status of the refrigeration case. The method also includes calculating, using the processor and based on instructions stored in the non-transitory memory, a weighted coefficient of performance based on based on (i) a refrigerant type, (ii) the case load of the refrigeration case, (iii) the case defrost status of the refrigeration case, and at least one of the of (iv) the refrigeration case temperature data and (v) the pressure data. The method also includes calculating using the processor and based on instructions stored in the non-transitory memory, a system performance index (SPI) for the refrigeration case based on the weighted Carnot efficiency of the refrigeration case and weighted actual Carnot efficiency. The method also includes generating, using the processor and in response to the SPI being below a threshold, an indication that the refrigeration case is operating below a threshold efficiency.

In some configurations, the method includes calculating at least one enthalpy for the refrigeration case based on a refrigerant type and at least one of the of the refrigeration case temperature data and the pressure data.

In some configurations, the method includes calculating the at least one enthalpy includes calculating a suction gas enthalpy, a liquid refrigerant enthalpy, and a discharge gas enthalpy.

In some configurations, the suction gas enthalpy is based on the refrigerant type, the suction gas pressure at the refrigeration case, and a suction gas temperature of the compressor.

In some configurations, the liquid refrigerant enthalpy is based on the refrigerant type and a liquid temperature of refrigerant exiting a condenser.

In some configurations, the discharge gas enthalpy is based on the refrigerant type, a discharge pressure, and a suction pressure.

In some configurations, the method includes calculating an actual Carnot efficiency based on the at least one enthalpy.

In some configurations, the method includes calculating a Carnot efficiency based on the outdoor temperature data and the refrigeration case temperature data.

In some configurations, the method includes calculating an adjusted case load of the evaporator based on the case defrost status of the evaporator and the case load of the evaporator.

In some configurations, the method includes calculating the weighted Carnot efficiency of the refrigeration case based on a Carnot efficiency of the refrigeration case and an adjusted case load of the evaporator.

In some configurations, the method includes calculating the weighted coefficient of performance based on an actual Carnot efficiency and an adjusted case load of the evaporator.

In some configurations, the method includes generating a regression model based on a plurality of SPIs, and, in response to the regression model being below an error threshold at a first instance of time, the instructions include generating an output indicating that the refrigeration case is operating below a threshold efficiency.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1C illustrate example refrigeration systems according to the present disclosure.

Corresponding reference numerals indicate corresponding parts throughout the several views of the drawings.

DETAILED DESCRIPTION

Example embodiments will now be described more fully with reference to the accompanying drawings.

Figure 1A:
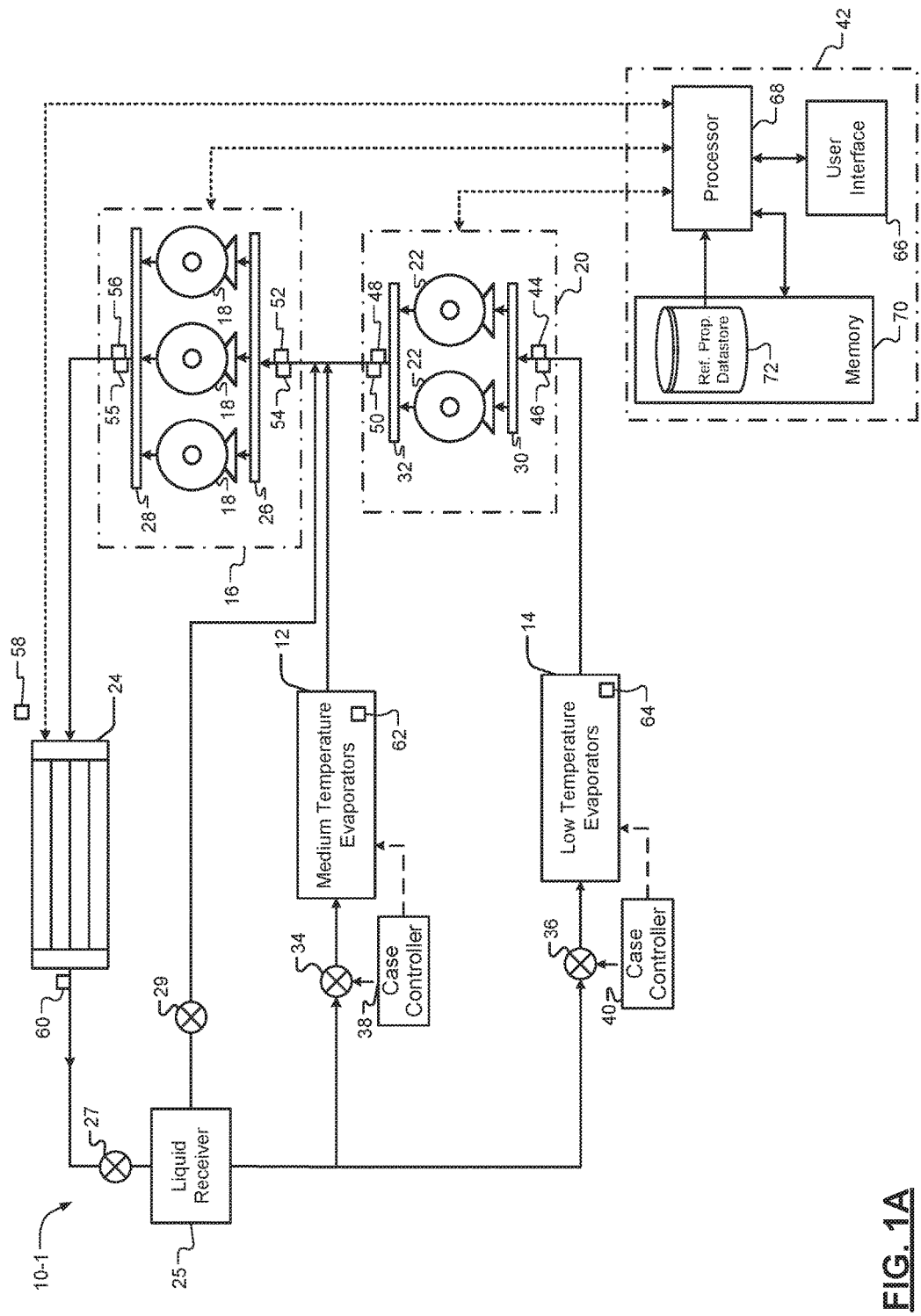

With reference to FIG. 1A, an example supermarket refrigeration system 10-1 is provided. The refrigeration system 10-1 may be a booster transcritical $CO_2$ refrigeration system, and the refrigeration system 10-1 can include at least one medium temperature refrigeration case 12 with a medium temperature evaporator that can be run at medium temperatures. The medium temperature refrigeration case 12, for example, may be used for meat or dairy products at the supermarket. The refrigeration system 10-1 can also include a low temperature refrigeration case 14 with a low temperature evaporator that can be run at low temperatures, which are less than the medium temperatures of the medium temperature refrigeration case 12. The low temperature refrigeration case 14, for example, may be used for frozen foods at the supermarket. Although FIG. 1 depicts one medium temperature refrigeration case 12 and one low temperature refrigeration case 14, the refrigeration system 10-1 can be configured as large or as small as needed with additional low temperature and medium temperature cases. The medium temperature refrigeration case 12 and the low temperature refrigeration case 14 are disposed in a retail area of the supermarket.

The refrigeration system 10-1 further includes a medium temperature compressor rack 16 with at least one first compressor 18 and a low temperature compressor rack 20 with at least one second compressor 22. The medium temperature compressor rack 16 and the low temperature compressor rack 20 may be located in a mechanical room, a storage area, on a roof, or in another non-retail area of the supermarket. The compressors 18, 22 may be fixed capacity or variable capacity compressors.

The refrigeration system 10-1 further includes a condenser 24, which may be located, for example, on a roof of the supermarket or at another suitable location outside of the retail area of the supermarket.

The first compressors 18 of the medium temperature compressor rack 16 are connected by a first suction header 26 and a first discharge header 28. Likewise, the second compressors 22 are connected by a second suction header 30 and a second discharge header 32. The low temperature compressor rack 20 is connected in series with the medium temperature compressor rack 16 such that the refrigerant discharged from the low temperature compressor rack 20 is received on a suction side of the medium temperature compressor rack 16. Alternatively, one of the compressor racks, for example the medium temperature compressor rack 16, may be integrated with the condenser 24 into at least one condensing unit, such as a rooftop condensing unit located on a rooftop of the retail area or a condensing unit located on the grounds outside of the retail area. Similarly, the low temperature compressor rack 20 may likewise be integrated with an evaporating unit of the low temperature refrigeration case 14.

The second compressors 22 of the low temperature compressor rack 20 receive a refrigerant vapor having a first or low pressure and discharge a refrigerant vapor having a second or intermediate pressure, with the second pressure being higher than the first pressure. The first compressors 18 of the medium temperature compressor rack 16 receive the second or intermediate pressure refrigerant vapor from the second compressors 22 and discharge a refrigerant vapor having a third or higher pressure, with the third pressure being higher than the second pressure.

The condenser 24 receives the high pressure refrigerant vapor from the medium temperature compressor rack 16. The condenser 24 may be operable in a subcritical mode or in a transcritical mode. In the transcritical mode, the condenser 24 functions as a gas cooler, and in the subcritical mode, the condenser 24 functions as a condenser.

The condenser 24 includes one or more fans that move ambient air over condenser coils of the condenser 24 to remove heat from the high pressure refrigerant vapor causing the refrigerant vapor to condense to a refrigerant liquid. In this way, the condenser 24 discharges a high pressure, low temperature refrigerant liquid.

Refrigerant discharged from the condenser 24 is received by liquid receiver 25 through a high pressure valve 27, which is configured to maintain an optimal pressure of the refrigerant entering the liquid receiver 25. The liquid receiver 25 is connected to a first expansion valve 34 that routes gaseous refrigerant form the liquid receiver 25 back to the suction side of the medium temperature compressor rack 16 via the medium temperature refrigeration case 12. The liquid receiver 25 is also connected to a second expansion valve 36 that routes liquid refrigerant from the liquid receiver 25 to the low temperature compressor rack 20 via the low temperature case 14. The liquid receiver 25 is also connected to a bypass valve 29 that routes gaseous refrigerant from the liquid receiver 25 to the suction side of the medium temperature compressor rack 16.

The high pressure, low temperature refrigerant liquid is received from the liquid receiver 25 by the medium temperature refrigeration case 12 through the first expansion valve 34 and by the low temperature refrigeration case 14 through the second expansion valve 36. The expansion valves 34, 36 receive the high pressure liquid from the condenser 24 and decrease the pressure of the refrigerant to discharge a low pressure liquid. The expansion valves 34, 36 can control the amount of refrigerant that is discharged to the respective evaporators of the respective medium temperature refrigeration case 12 and the low temperature refrigeration case 14. Thus, the expansion valves 34, 36 are used to control the temperature ranges of the medium temperature refrigeration case 12 and the low temperature refrigeration case 14, respectively. The expansion valves 34, 36 may be thermostatic expansion valves (TXV), pulse type solenoids, or electronic expansion valves (EXV), by way of non-limiting example.

The refrigeration system 10-1 can also include case controllers 38, 40 for controlling the temperatures of the medium temperature refrigeration case 12 and the low temperature refrigeration case 14, respectively. For example, the case controllers 38, 40 may activate, deactivate, and adjust evaporator fans of the evaporators located with the medium temperature refrigeration case 12 and the low temperature refrigeration case 14. The case controllers 38, 40 may also adjust the expansion valves 34, 36, in the event EXV type expansion valves are used.

Liquid refrigerant from the expansion valves 34, 36 enters the evaporators of the medium temperature refrigeration case 12 and the low temperature refrigeration case 14 and absorbs heat from the respective refrigeration case 12, 14 to vaporize. Specifically, the medium temperature refrigeration case 12 and the low temperature refrigeration case 14 each include an evaporator coil with an evaporator fan that circulates air from within the respective refrigeration case across the evaporator coil, thereby causing heat from the circulated air to be absorbed by the refrigerant within the evaporator coil. In this way, the medium temperature refrigeration case 12 and the low temperature refrigeration case 14 receive low pressure refrigerant liquid from the respective expansion valves 34, 36 and discharge low pressure refrigerant vapor.

Refrigerant discharged from the evaporator coil of the low temperature refrigeration case 14 is discharged to the suction header 30 of the low temperature compressor rack 20. Refrigerant discharged from the evaporator coil of the medium temperature refrigeration case 12 is discharged to the suction header 26 of the medium temperature compressor rack 16.

The refrigeration system 10-1 includes a controller 42 that monitors operating and environmental conditions, including temperatures and pressures, and controls the various system components according to programmed control strategies. Specifically, the controller 42 controls the compressor racks 16, 20 by activating, deactivating, and adjusting the compressor capacity of the compressors 18, 22 of the compressor racks 16, 20. The controller 42 also controls the condenser 24 by activating, deactivating, and adjusting the capacity of the condenser fans of the condenser 24. The controller 42 may be, for example, an Einstein RX Refrigeration Controller, an Einstein BX Building/HVAC Controller, an E2 RX Refrigeration Controller, an E2 BX HVAC Controller, or an E2 CX Convenience Store Controller, available from Emerson Climate Technologies Retail Solutions, Inc., of Kennesaw, Ga.

The controller 42 may include a user interface 66, such as a touchscreen or a display screen and user input device, such as a keyboard, to communicate with a user. For example, the system controller 42 may output and display system parameters, such as system operating temperatures or pressures, and/or system setpoints to a user. Further, the system controller 42 may receive user input modifying the system setpoints or control algorithms.

The controller 42 may be in communication with various sensors of the refrigeration system 10-1 and may receive various operating temperature or pressures of the refrigeration system 10-1. For example, the refrigeration system 10-1 may include a low temperature suction pressure sensor 44 that monitors and outputs a low temperature suction pressure ($P_{sucLT}$) of the low temperature compressor rack 20. For further example, the refrigeration system 10-1 may include a low temperature suction temperature sensor 46 that monitors and outputs a low temperature suction temperature ($T_{sucLT}$) of the low temperature compressor rack 20. For further example, the refrigeration system 10-1 may include a low temperature discharge pressure sensor 48 that monitors and outputs a low temperature discharge pressure ($P_{disLT}$) of the low temperature compressor rack 20. For further example, the refrigeration system 10-1 may include a low temperature discharge temperature sensor 50 that monitors and outputs a low temperature discharge temperature ($T_{disLT}$) of the low temperature compressor rack 20. For further example, the refrigeration system 10-1 may include a medium temperature suction pressure sensor 52 that monitors and outputs a medium temperature suction pressure ($P_{sucMT}$) of the medium temperature compressor rack 16. For further example, the refrigeration system 10-1 may include a medium temperature suction temperature sensor 54 that monitors and outputs a medium temperature suction temperature ($T_{sucMT}$) of the medium temperature compressor rack 16. For further example, the refrigeration system 10-1 may include a medium temperature discharge temperature sensor 55 that monitors and outputs a medium temperature discharge temperature ($T_{disMT}$) of the medium temperature compressor rack 16. For further example, the refrigeration system 10-1 may include a medium temperature discharge pressure sensor 56 that monitors and outputs a medium temperature discharge pressure ($P_{disMT}$) of the medium temperature compressor rack 16. For further example, the refrigeration system 10-1 may include an outdoor air temperature sensor 58 that monitors and outputs an outdoor air temperature ($T_{oat}$). For further example, the refrigeration system 10-1 may include a liquid line temperature sensor 60 that monitors and outputs a liquid temperature ($T_{liq}$) of the liquid refrigerant exiting the condenser 24. Alternatively, if a receiver is used and receives liquid refrigerant from the condenser, the liquid line temperature sensor 60 may alternatively monitor and output the liquid temperature ($T_{liq}$) of the liquid refrigerant exiting the receiver. For further example, the refrigeration system 10-1 may include a medium temperature refrigeration case temperature sensor 62 that monitors and outputs a temperature ($T_{caseMT}$) of the medium temperature refrigeration case 12. For further example, the refrigeration system 10-1 may include a low temperature refrigeration case temperature sensor 64 that monitors and outputs a temperature ($T_{caseLT}$) of the low temperature refrigeration case 14.

The controller 42 may monitor and receive data from each of the various temperature and pressure sensors 44, 46, 48, 50, 52, 54, 55, 56, 58, 60, 62, 64. For example, the controller 42 may be in direct communication with the various temperature and pressure sensors 44, 46, 48, 50, 52, 54, 55, 56, 58, 60, 62, 64. Alternatively, the controller 42 may communicate with the various temperature and pressure sensors 44, 46, 48, 50, 52, 54, 55, 56, 58, 60, 62, 64 through another controller such as a case controller 38, 40, a compressor rack controller, and/or a condenser controller. While the refrigeration system 10-1 is described as having various temperature and pressure sensors 44, 46, 48, 50, 52, 54, 55, 56, 58, 60, 62, 64 to monitor the various temperatures and pressures of the refrigeration system 10-1, additionally or alternatively, one or more of the various temperatures and pressures of the refrigeration system 10-1 can be inferred or calculated from other monitored data.

The controller 42 may also include a processor 68 that is configured to, based on instructions stored in a memory 70 (e.g., read-only memory (ROM) and/or random-access memory (RAM)), perform the dynamic coefficient of performance calculations described below. The processor 66, using a plurality of input/output (I/O) ports of the controller 42, may receive the operating data of the refrigeration system 10-1, including the various temperatures and pressures received from the various temperature and pressure sensors 44, 46, 48, 50, 52, 54, 55, 56, 58, 60, 62, 64. Then, as described below, the processor 68 may determine a system performance index (SPI) for the low and medium temperature compressor racks 16, 20 based on the various temperatures and pressures received. Furthermore, the processor 68 may be in communication with and access a refrigerant property database 72, which is configured to store a plurality of refrigerant properties for various refrigerant types that may be used in the refrigeration system 10-1. As such, the processor 68 may be configured to determine various enthalpies that are used to determine the SPI for the low and medium temperature compressor racks 16, 20, as described below.

With reference to FIG. 1B, another example supermarket refrigeration system 10-2 is shown. The refrigeration system 10-2 is similarly configured to refrigeration system 10-1, but in this embodiment, the refrigerant property database 72 is provided by a web service. Accordingly, the processor 68 may be in communication with the refrigerant property database 72 via a local area network (LAN), the Internet, a wide area network (WAN), or combinations thereof. Additionally or alternatively, the refrigerant property database 72 may be stored on a remote server, and therefore, the processor 68 may be in communication with the refrigerant property database 72 using a telemetric link, such as Wi-Fi, LTE, or other suitable telemetric link for communication.

Figure 1C:
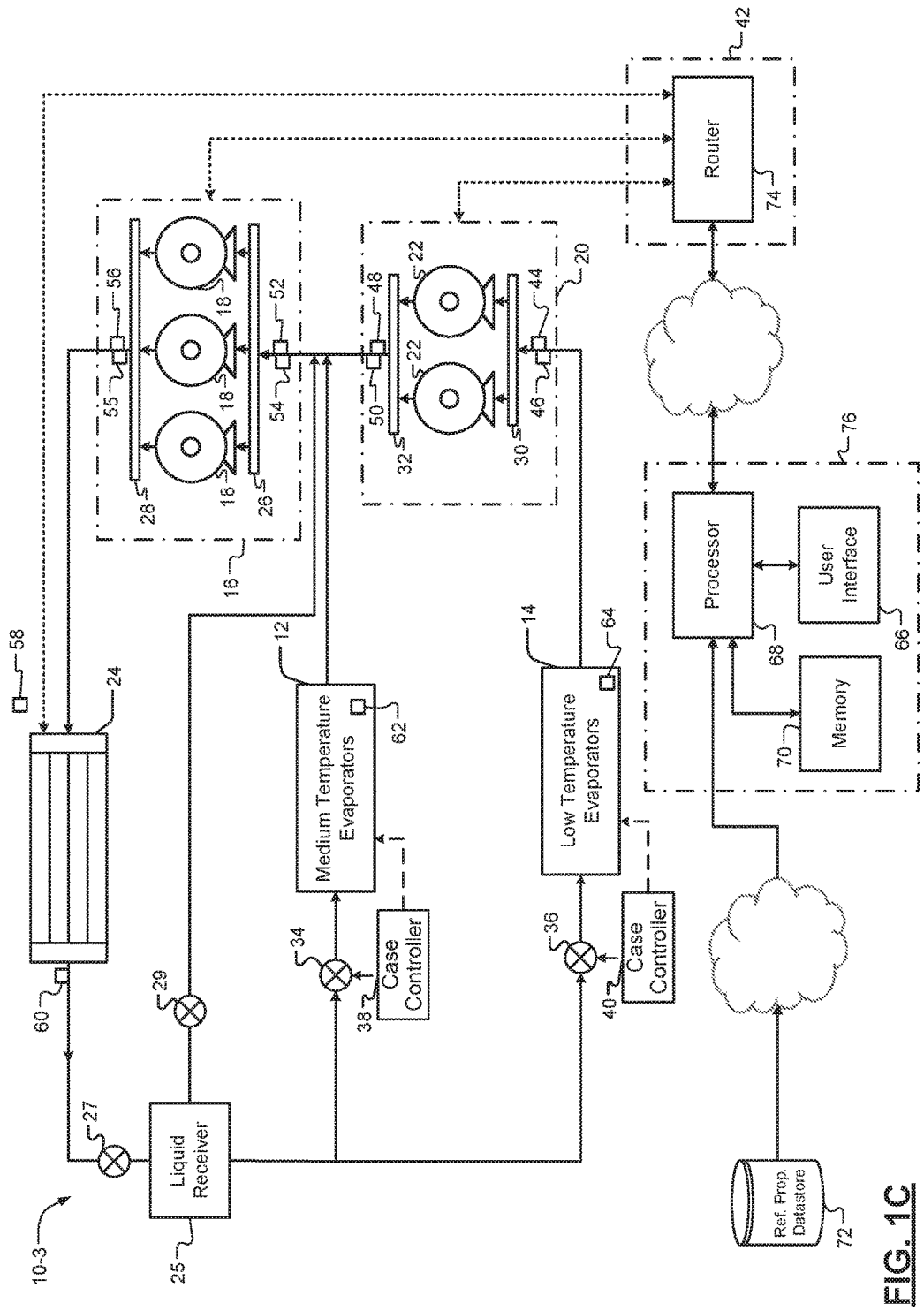

With reference to FIG. 1C, another example supermarket refrigeration system 10-3 is shown. The refrigeration system 10-3 is similarly configured to refrigeration system 10-1, but in this embodiment, the refrigeration system 10-3 includes a remote computing system 76, and the controller 42 includes a router 74. The router 74 is configured to transmit the pressure and temperature data received from the various sensors of the refrigeration system 10-3 to the remote computing system 76. The controller 42 may be in communication with the remote computing system 76 using a telemetric link, such as a Wi-Fi, an LTE, or other suitable telemetric link for communication. In response to the remote computing system 76 receiving the temperature and pressure data, the remote computing system 76, using the processor 68 and based on instructions stored in the memory 70, is configured to determine the SPI of the low and medium temperature compressor racks 16, 20, as discussed below. Additionally, the remote computing system 76 may be in communication with the refrigerant property database 72 via a local area network (LAN), the Internet, a wide area network (WAN), or combinations thereof. Additionally or alternatively, the refrigerant property database 72 may be stored on a remote server, and therefore, the processor 68 may be in communication with the refrigerant property database 72 using a telemetric link, such as Wi-Fi, LTE, or other telemetric link of the like.

Figure 2A:
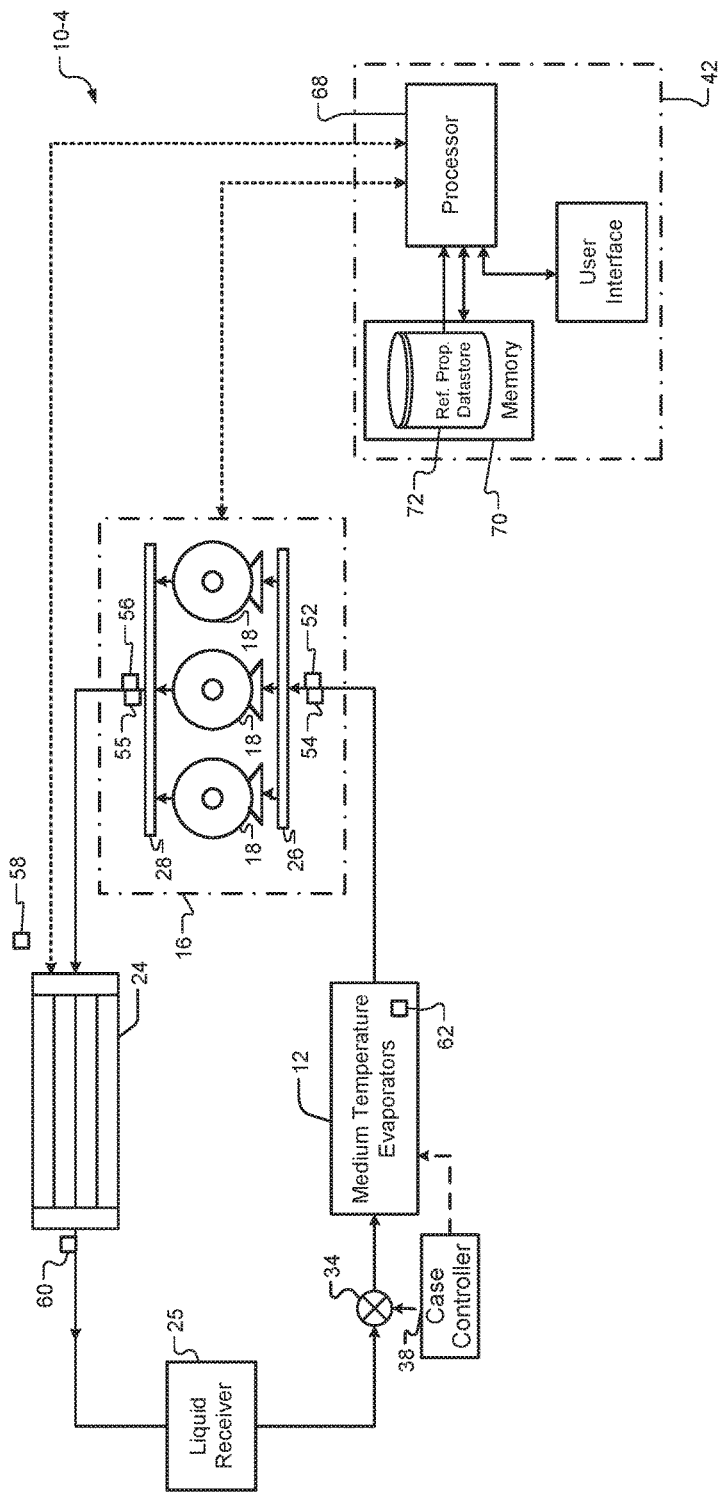
FIGS. 2A-2C illustrates another example refrigeration system according to the present disclosure.
Figure 2B:
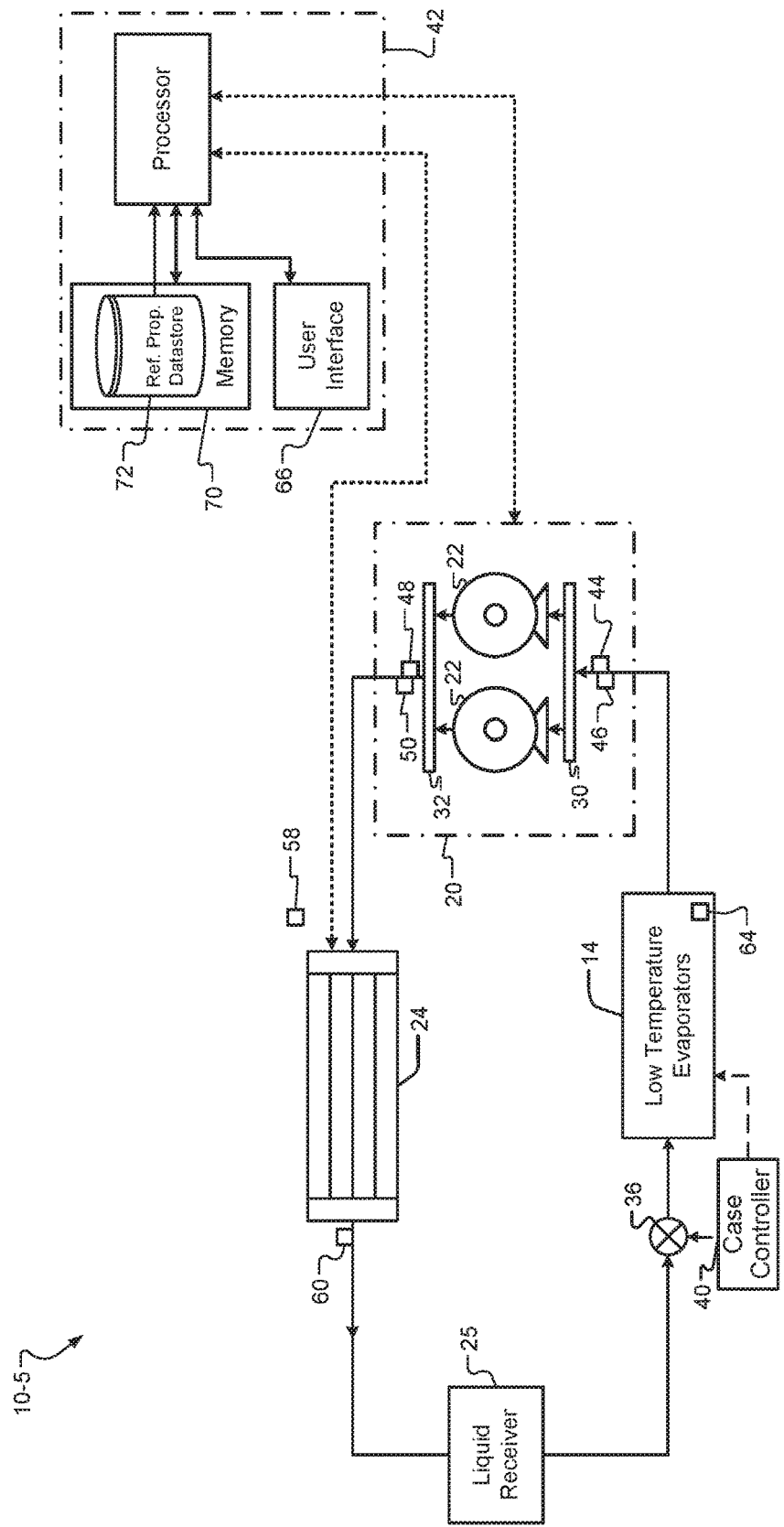

With reference to FIG. 2A, another example supermarket refrigeration system 10-4 is shown. The refrigeration system 10-4 is similarly configured to refrigeration system 10-1, but in this embodiment, the refrigeration system 10-4 includes the medium temperature refrigeration case 12, the medium temperature compressor rack 16, the condenser 24, the liquid receiver 25, and the case controller 38. In other words, this embodiment may be implemented when the refrigeration system only includes one type of refrigeration case, such as medium temperature refrigeration cases for meat or dairy products. Alternatively and as shown in FIG. 2B, refrigeration system 10-5 may include only low temperature refrigeration cases, such as low temperature refrigeration case 14, the low temperature compressor rack 20, the condenser 24, the liquid receiver 25, and the case controller 40.

Figure 2C:
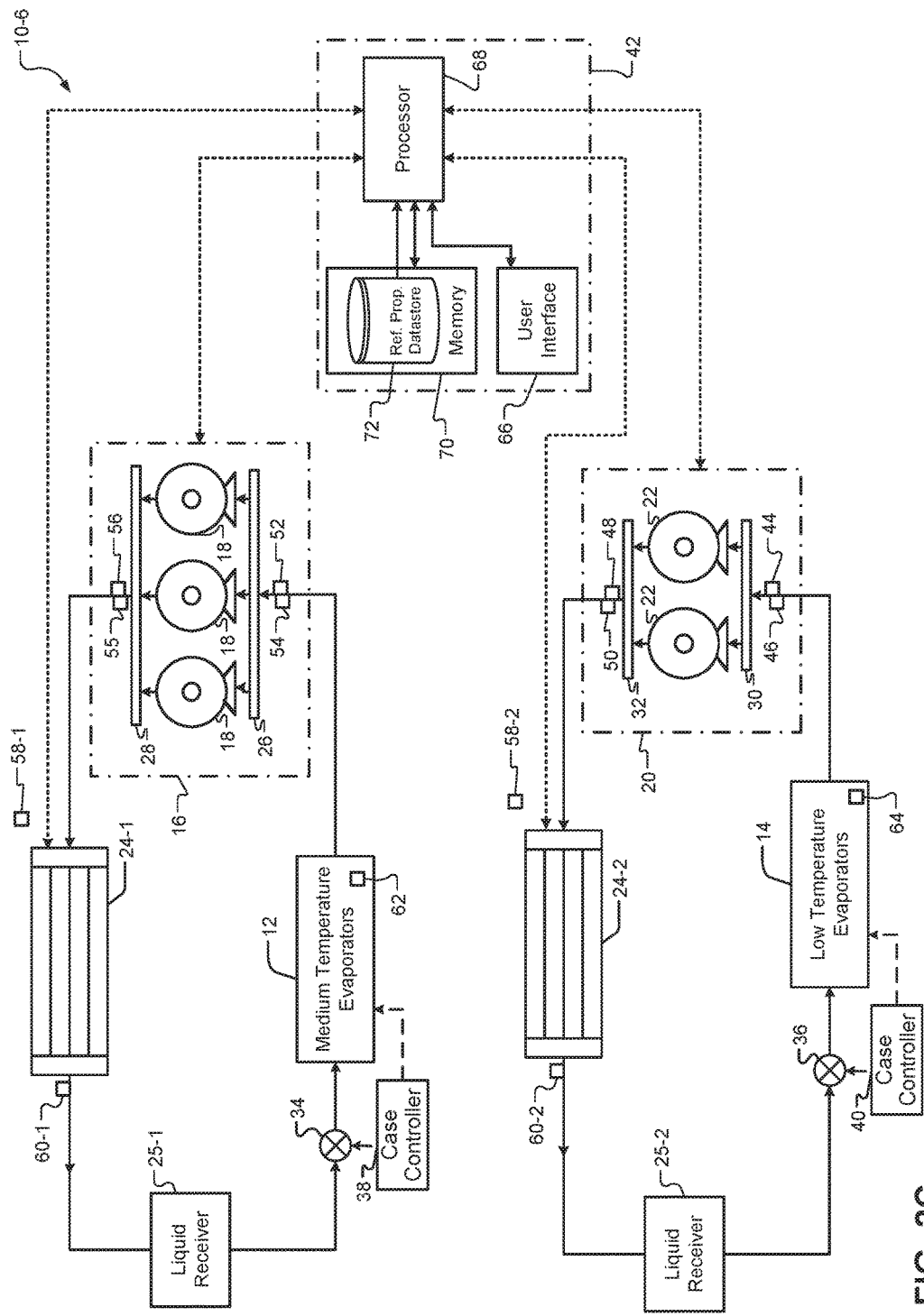

With reference to FIG. 2C, another example supermarket refrigeration system 10-6 is shown. The refrigeration system 10-6 is similarly configured to refrigeration system 10-1, but in this embodiment, the medium temperature refrigeration case 12 and the medium temperature compressor rack 16 are associated with a first condenser 24-1, a first liquid receiver 25-1, a first outdoor air temperature sensor 58-1, and a first liquid line temperature sensor 60-1. Additionally, the low temperature refrigeration case 14 and the low temperature compressor rack 20 are associated with a second condenser 24-2, a second liquid receiver 25-2, a second outdoor air temperature sensor 58-2, and a second liquid line temperature sensor 60-2. In other words, this embodiment may be implemented when the medium temperature refrigeration case 12 and the medium temperature compressor rack 16 are configured to operate in parallel with the low temperature refrigeration case 14 and the low temperature compressor rack 20.

Figure 3:
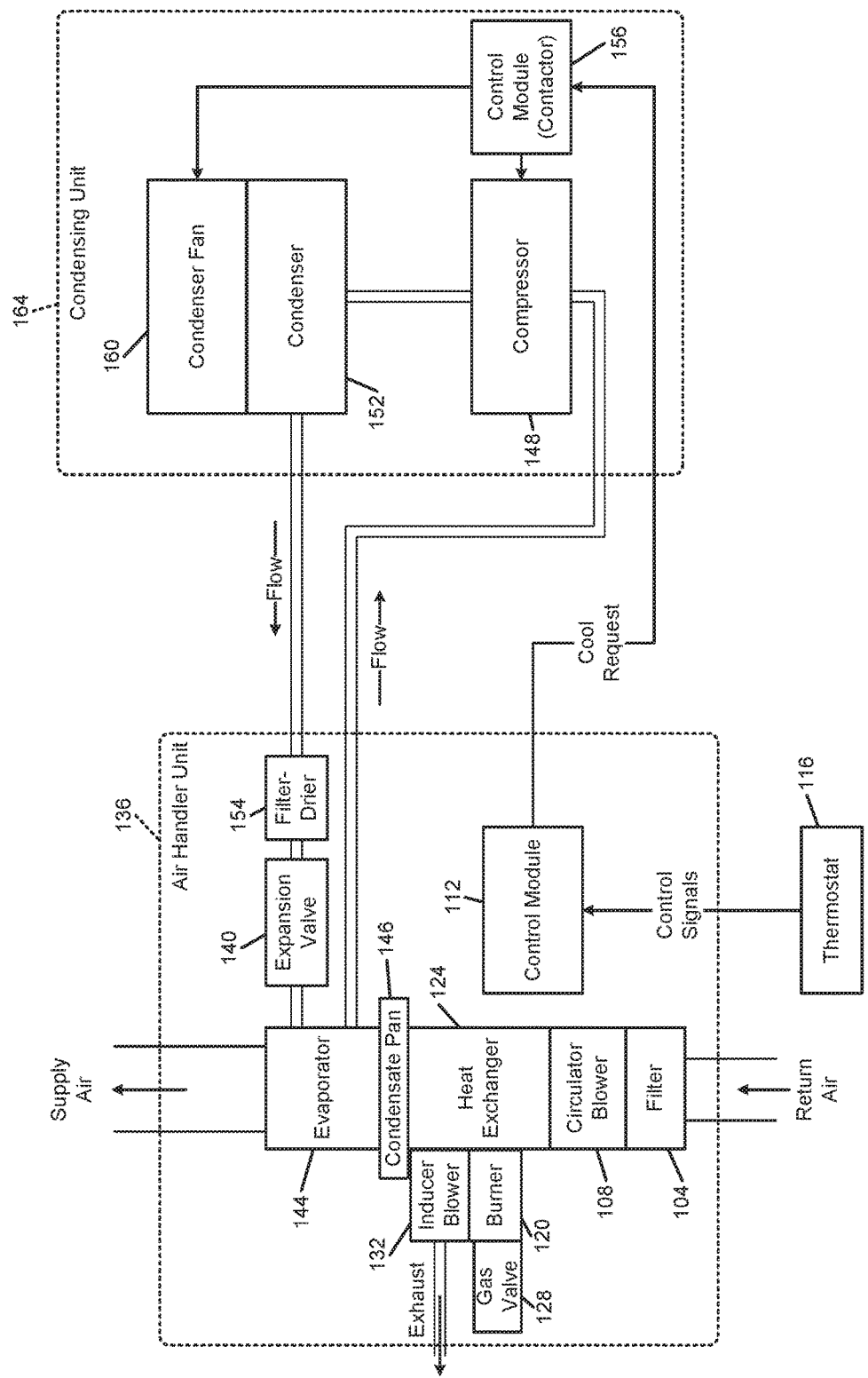
FIG. 3 illustrates an example HVAC system according to the present disclosure.

With reference to FIG. 3, a block diagram of an example HVAC system is shown. As described above, the SPI can also be determined for an HVAC system located in, for example, a residential or small commercial unit. In this particular example, a forced air system with a gas furnace is shown. Return air is pulled from the building through a filter 104 by a circulator blower 108. The circulator blower 108, also referred to as a fan, is controlled by a control module 112. The control module 112 receives signals from a thermostat 116. For example only, the thermostat 116 may include one or more temperature set points specified by the user.

The thermostat 116 may direct that the circulator blower 108 be turned on at all times or only when a heat request or cool request is present (automatic fan mode). In various implementations, the circulator blower 108 can operate at multiple speeds or at any speed within a predetermined range. One or more switching relays (not shown) may be used to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control module 112, the burner 120, the heat exchanger 124, the inducer blower 132, an expansion valve 140, an evaporator 144, and a condensate pan 146. In various implementations, the air handler unit 136 may include an electrical heating device 121 instead of or in addition to the burner 120. When used in addition to the burner 120, the electrical heating device 121 may provide backup or secondary heat.

The HVAC system includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold, which causes water vapor to condense. This water vapor is collected in the condensate pan 146, which drains or is pumped out.

A control module 156 receives a cool request from the control module 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in a single condensing unit 164. A filter-drier 154 may be located between the condenser 152 and the expansion valve 140. The filter-drier 154 removes moisture and/or other contaminants from the circulating refrigerant.

In various implementations, the control module 156 may simply include a run capacitor, a start capacitor, and a contactor or relay. In fact, in certain implementations, the start capacitor may be omitted, such as when a scroll compressor instead of a reciprocating compressor is being used. The compressor 148 may be a variable-capacity compressor and may respond to a multiple-level cool request. For example, the cool request may indicate a mid-capacity call for cool or a high-capacity call for cool.

The electrical lines provided to the condensing unit 164 may include a 240 volt mains power line (not shown) and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor 148. In addition, the contactor may connect the 240 volt power supply to the condenser fan 160. In various implementations, such as when the condensing unit 164 is located in the ground as part of a geothermal system, the condenser fan 160 may be omitted. When the 240 volt mains power supply arrives in two legs, as is common in the U.S., the contactor may have two sets of contacts, and can be referred to as a double-pole single-throw switch.

Figure 4A:
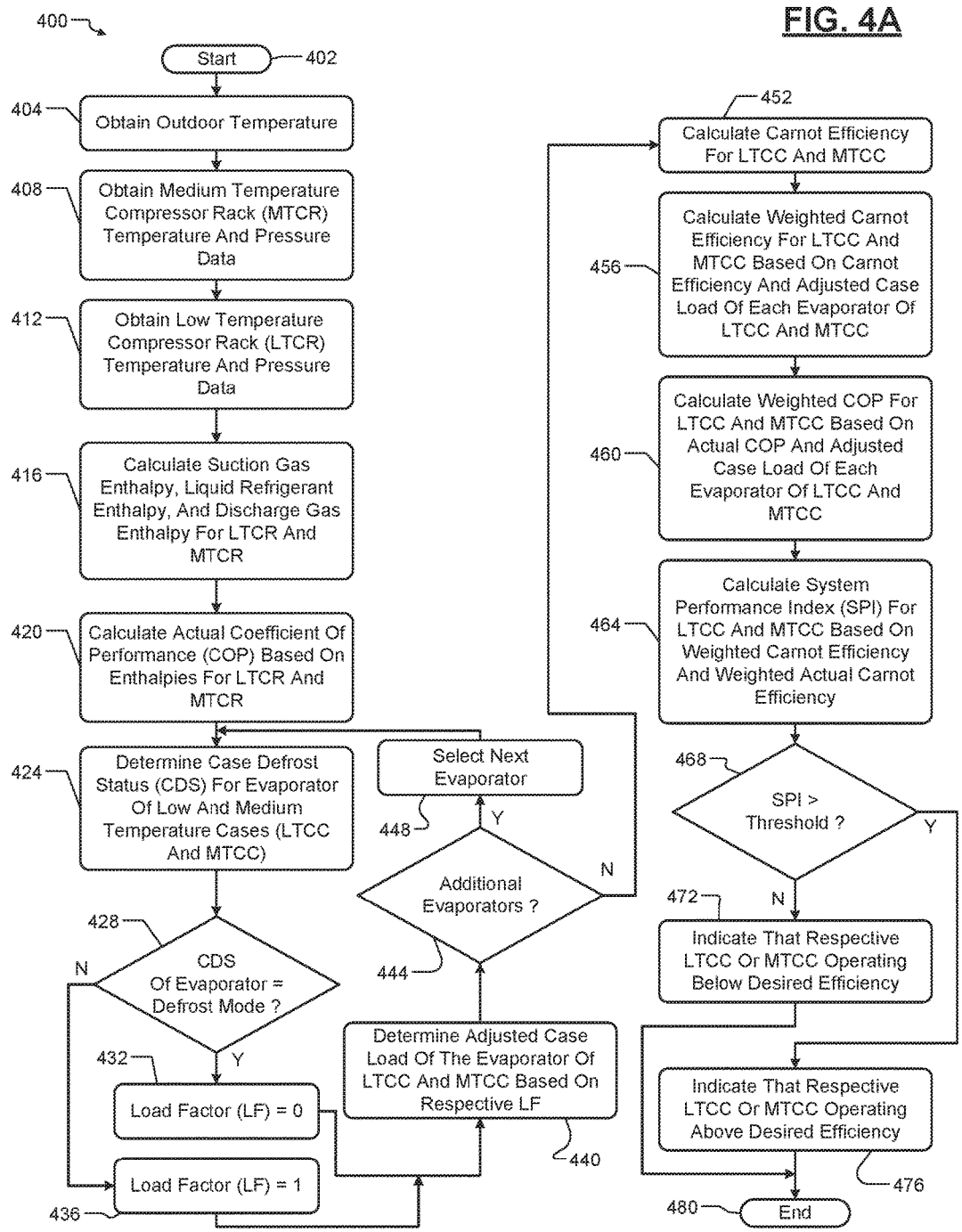
FIGS. 4A-4C are flowcharts for a control algorithm according to the present disclosure.

With reference to FIG. 4A, a flowchart for a control algorithm 400 that is configured to determine a system performance index (SPI) of the low and medium temperature compressor racks 16, 20 is shown. The SPI is a refrigeration system efficiency value that is normalized based on ambient conditions and the size of the low and medium temperature compressor racks 16, 20. Additionally, determining the SPI, as described herein, does not require the use of a flow meter or an energy meter, and it may be accomplished using sensors that are typically integrated into the refrigeration system. Therefore, determining the SPI using control algorithm 400 may reduce the cost and complexity of determining a normalized efficiency value of the refrigeration system. Alternatively, the SPI may also be used to indicate the efficiency of an HVAC system or other similar systems.

The control algorithm 400 starts at 402 when, for example, an operator, using a button or other similar user interface element of the user interface 66, initiates the control algorithm 400. Alternatively, the control algorithm 400 may start at 402 when the controller 42 is powered on, and the controller 42 may be configured to determine the SPI continuously or at predefined intervals of time.

At 404, the control algorithm 400 obtains the outdoor air temperature ($T_{oat}$) using the outdoor air temperature sensor 58. At 408, the control algorithm 400 obtains the medium temperature compressor rack temperature and pressure data. Specifically, the controller 42 obtains the medium temperature suction pressure ($P_{sucMT}$) from the medium temperature suction pressure sensor 52, the medium temperature discharge pressure ($P_{disMT}$) from the medium temperature discharge pressure sensor 56, the medium temperature suction temperature ($T_{sucMT}$) from the medium temperature suction temperature sensor 54, and the medium temperature discharge temperature ($T_{disMT}$) from the medium temperature discharge temperature sensor 55. At 412, the control algorithm 400 obtains the low temperature compressor rack temperature and pressure data. Specifically, the controller 42 obtains the low temperature suction pressure ($P_{sucLT}$) from the low temperature suction pressure sensor 44, the low temperature discharge pressure ($P_{disLT}$) from the low temperature discharge pressure sensor 48, the low temperature suction temperature ($T_{sucLT}$) from the low temperature suction temperature sensor 46, and the low temperature discharge temperature ($T_{disLT}$) from the low temperature discharge temperature sensor 50.

At 416, the control algorithm 400 calculates a suction gas enthalpy, a liquid refrigerant enthalpy, and a discharge gas enthalpy (collectively referred to as enthalpies) for the low temperature and medium temperature compressor racks 16, 20. The suction gas enthalpy may be calculated as a function of the refrigerant type, the suction pressure, and the suction gas temperature. The liquid refrigerant enthalpy may be calculated as a function of the refrigerant type and the liquid temperature ($T_{liq}$) of the refrigerant exiting the condenser 24. The discharge gas enthalpy may be calculated as a function of the refrigerant type, the discharge pressure, and the discharge temperature. In other words, the enthalpies of the low temperature and medium temperature compressor racks 16, 20 may be calculated based on the following equations:

$$h_{Suction\_LT} = f(\text{refrigerant type}, P_{sucLT}, T_{sucLT}) \quad (1)$$

$$h_{Suction\_MT} = f(\text{refrigerant type}, P_{sucMT}, T_{sucMT}) \quad (2)$$

$$h_{Liquid\_LT} = f(\text{refrigerant type}, T_{liqLT}) \quad (3)$$

$$h_{Liquid\_MT} = f(\text{refrigerant type}, T_{liqMT}) \quad (4)$$

$$h_{Discharge\_LT} = f(\text{refrigerant type}, P_{disLT}, T_{disLT}) \quad (5)$$

$$h_{Discharge\_MT} = f(\text{refrigerant type}, P_{disMT}, T_{disMT}) \quad (6)$$

If only a single type of compressor rack, such as only a low temperature compressor rack or only a medium temperature compressor rack, is present in the refrigeration system, then only the applicable enthalpies for the compressor rack present in the system are calculated.

At 420, the control algorithm 400 calculates an actual coefficient of performance (COPactual) based on the enthalpies of each of the low temperature and medium temperature compressor racks 16, 20. In order to determine the COPactual of the low temperature and medium temperature compressor racks 16, 20, the following equations are used:

$$COPactual_{LT} = \frac{h_{Suction\_LT} - h_{Liquid\_LT}}{h_{Discharge\_LT} - h_{Suction\_LT}} \quad (7)$$

$$COPactual_{MT} = \frac{h_{Suction\_MT} - h_{Liquid\_MT}}{h_{Discharge\_MT} - h_{Suction\_MT}} \quad (8)$$

Again, if only a single type of compressor rack, such as only a low temperature compressor rack or only a medium temperature compressor rack, is present in the refrigeration system, then only the applicable COPactual value for the compressor rack present in the system is calculated.

At 424, the control algorithm 400 determines a case defrost status (CDS) of the evaporator of the low and medium temperature refrigeration cases 12, 14. The evaporator may be in a defrost mode if, for example, the temperature of the evaporator coil for the applicable refrigeration case is being raised to melt any frost that has accumulated on the evaporator coil. Conversely, the evaporator may not be in the defrost mode if the refrigeration case and corresponding compressor rack are operating normally.

At 428, the control algorithm 400 determines whether the CDS indicates that the evaporator of the low and medium temperature refrigeration cases 12, 14 is in the defrost mode. If so, the control algorithm sets a load factor (LF) of the respective evaporator equal to 0 at 432 and then proceeds to 440. Otherwise, if the control algorithm 400 determines that the CDS of the evaporator is not in the defrost mode, the control algorithm 400 sets the LF of the respective evaporator equal to 1 at 436 and then proceeds to 440. The LF may be a numerical representation of the CDS. As an example, the LF may be set to a first value in response to the CDS indicating that it is in the defrost mode, and the LF may be set to a second value in response to the CDS indicating it is not in the defrost mode, wherein the first value is less than the second value.

At 440, the control algorithm 400 determines an adjusted case load value (AdjustedCaseLoad) for the evaporator of the low and medium temperature refrigeration cases 12, 14 based on the LF of the respective evaporator. As an example, the adjusted case load value for each evaporator are calculated using the following equations:

$$\text{AdjustedCaseLoad}_{LT} = LF_{LT} * \text{CaseLoad}_{LT} \quad (9)$$

$$\text{AdjustedCaseLoad}_{MT} = LF_{MT} * \text{CaseLoad}_{MT} \quad (10)$$

If only a single type of refrigeration case, such as only a low temperature refrigeration case or only a medium temperature refrigeration case, is present in the refrigeration system, then only the applicable adjusted case load value for the refrigeration case present in the system is calculated.

In other words, if the refrigeration case is in the defrost mode, the adjusted case load value for the respective evaporator is 0; otherwise, if the evaporator is not in the defrost mode, the adjusted case load value for the respective evaporator is equal to the measured or design case load of the evaporator, e.g., 12,000 BTU.

At 444, the control algorithm 400 determines whether additional evaporators are present in the refrigeration system. If so, the control algorithm 400 proceeds to 448; otherwise, the control algorithm 400 proceeds to 452. At 448, the control algorithm 400 selects the next evaporator in the refrigeration system and proceeds to 424.

At 452, the control algorithm 400 calculates a Carnot efficiency (COPcarnot) for each of the low and medium temperature refrigeration cases 12, 14. The Carnot efficiency is a theoretical efficiency of the low and medium temperature refrigeration cases 12, 14 when they operate between two different temperatures. As an example, to calculate the Carnot efficiency of each of the low and medium temperature refrigeration cases 12, 14, the following equations are used:

$$COPcarnot_{LT} = \frac{Tcase_{LT}}{T_{OAT} - Tcase_{LT}} \quad (11)$$

$$COPcarnot_{MT} = \frac{Tcase_{MT}}{T_{OAT} - Tcase_{MT}} \quad (12)$$

If only a single type of refrigeration case, such as only a low temperature refrigeration case or only a medium temperature refrigeration case, is present in the refrigeration system, then only the applicable COPcarnot for the refrigeration case present in the system is calculated.

At 456, the control algorithm 400 calculates a weighted Carnot efficiency (COPweighted_carnot) of the low and medium temperature refrigeration cases 12, 14 based on the Carnot efficiency (COPcarnot) and the adjusted case load value (AdjustedCaseLoad) of each evaporator of the low and medium temperature refrigeration cases 12, 14. In order to calculate the weighted Carnot efficiency, the following equations are used:

$$COPweighted\_carnot_{LT} = \frac{\sum_{1}^{LT} AdjustedCaseLoad_{LT}}{\sum_{1}^{LT} \frac{AdjustedCaseLoad_{LT}}{COPcarnot_{LT}}} \quad (13)$$

$$COPweighted\_carnot_{MT} = \frac{\sum_{1}^{MT} AdjustedCaseLoad_{MT}}{\sum_{1}^{MT} \frac{AdjustedCaseLoad_{MT}}{COPcarnot_{MT}}} \quad (14)$$

If only a single type of refrigeration case, such as only a low temperature refrigeration case or only a medium temperature refrigeration case, is present in the refrigeration system, then only the applicable COPweighted_carnot for the refrigeration case present in the system is calculated.

At 460, the control algorithm 400 calculates a weighted actual COP (COPweighted_actual) for the low and medium temperature refrigeration cases 12, 14 based on the actual COP (COPactual) and the case load value (AdjustedCaseLoad) of each evaporator of the low and medium temperature refrigeration cases 12, 14. In order to calculate the weighted COP, the following equations are used:

$$COPweighted\_actual_{LT} = \frac{\sum_{1}^{LT} AdjustedCaseLoad_{LT}}{\sum_{1}^{LT} \frac{AdjustedCaseLoad_{LT}}{COPactual_{LT}}} \quad (15)$$

$$COPweighted\_actual_{MT} = \frac{\sum_{1}^{MT} AdjustedCaseLoad_{MT}}{\sum_{1}^{MT} \frac{AdjustedCaseLoad_{MT}}{COPactual_{MT}}} \quad (16)$$

If only a single type of refrigeration case, such as only a low temperature refrigeration case or only a medium temperature refrigeration case, is present in the refrigeration system, then only the applicable COPweighted_actual for the refrigeration case present in the system is calculated.

At 464, the control algorithm 400 calculates the SPI for the low and medium temperature refrigeration cases 12, 14 based on the weighted actual COP (COPweighted_actual) and the weighted Carnot efficiency (COPweighted_carnot) of the low and medium temperature refrigeration cases 12, 14. In order to calculate the SPI, the following equations are used:

$$SPI_{LT} = \frac{COPweighted\_actual_{LT}}{COPweighted\_carnot_{LT}} \quad (17)$$

$$SPI_{MT} = \frac{COPweighted\_actual_{MT}}{COPweighted\_carnot_{MT}} \quad (18)$$

If only a single type of refrigeration case, such as only a low temperature refrigeration case or only a medium temperature refrigeration case, is present in the refrigeration system, then only the applicable SPI for the refrigeration case present in the system is calculated.

By comparing the weighted actual COP and the weighted Carnot efficiency to obtain the SPI, the control algorithm 400 generates a normalized value of the efficiency of the low and medium temperature refrigeration cases 12, 14. As an example, the SPI may represent an efficiency value that normalizes differences in outdoor ambient air temperatures, the size, and/or the type of each refrigeration system of multiple refrigeration systems.

At 468, the control algorithm 400 determines whether the SPI of one of the low and medium temperature refrigeration cases 12, 14 is greater than a threshold SPI. The threshold SPI represents a minimum level of efficiency that is required for the refrigeration system to properly operate. The threshold SPI may be predetermined, determined by an operator of the refrigeration system, or may be a dynamic value that is configured to update based on the refrigeration system diagnostics or an administrator of the remote computing system. If so, the control algorithm 400 proceeds to 472; otherwise, the control algorithm 400 proceeds to 476.

At 472, the control algorithm 400 indicates that the respective low or medium temperature refrigeration case 12, 14 is operating above the desired efficiency and then proceeds to 480. As an example, the control algorithm 400 may, using the controller 42, provide textual or other visual indications on the user interface 66 that indicate the low or medium temperature refrigeration case 12, 14 is operating above the desired efficiency. At 476, the control algorithm 400 indicates that the respective low or middle temperature compressor case 12, 14 is operating below the desired efficiency and then proceeds to 480. As an example, the control algorithm 400 may, using the controller 42, provide textual or other visual indications on the user interface 66 that indicate the low or medium temperature refrigeration case 12, 14 is operating below the desired efficiency. Additionally or alternatively, the control algorithm 400 may, using the controller, initiate a visual alarm (e.g., an LED status indicator) and/or an auditory alarm (e.g., a beeping tone) that indicates the low or middle temperature compressor case 12, 14 is operating below the desired efficiency. At 480, the control algorithm 400 ends.

Figure 4B:
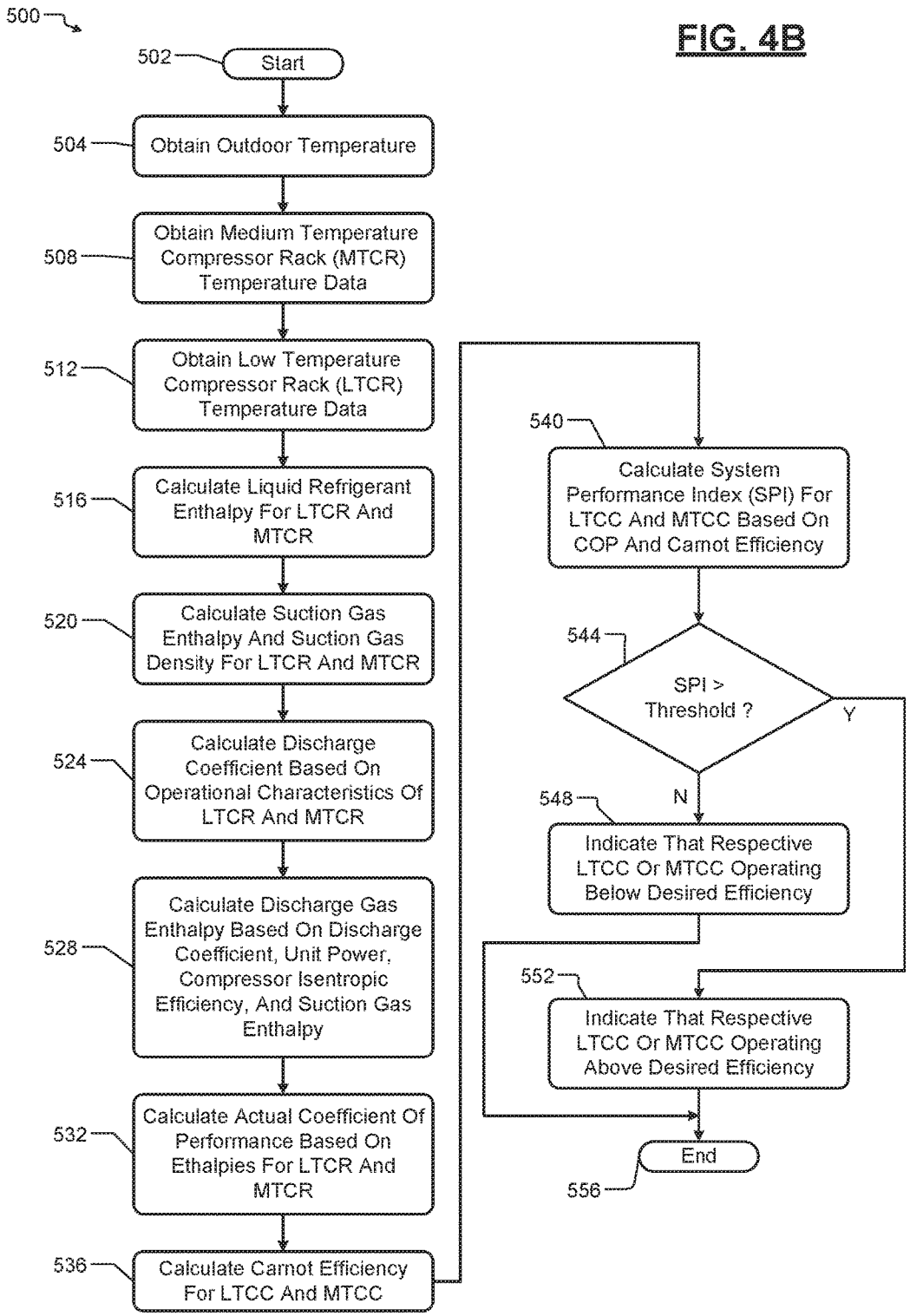

With reference to FIG. 4B, another flowchart for a control algorithm 500 that is configured to determine the SPI of the low and medium temperature compressor racks 16, 20 is shown. As described above, the SPI is a refrigeration system efficiency value that is normalized based on ambient conditions and the size of the low and medium temperature compressor racks 16, 20. The control algorithm 500 starts at 502 when, for example, an operator, using a button or other similar user interface element of the user interface 66, initiates the control algorithm 500. Alternatively, the control algorithm 500 may start at 502 when the controller 42 is powered on, and the controller 42 may be configured to determine the SPI continuously or at predefined intervals of time.

At 504, the control algorithm 500 obtains the outdoor air temperature ($T_{oat}$) using the outdoor air temperature sensor 58. At 508, the control algorithm 500 obtains the medium temperature compressor rack temperature. As an example, the controller 42 obtains the medium temperature suction temperature ($T_{sucMT}$) from the medium temperature suction temperature sensor 54 and the medium temperature discharge temperature ($T_{disMT}$) from the medium temperature discharge temperature sensor 55. At 512, the control algorithm 500 obtains the low temperature compressor rack temperature data. The controller 42 may obtain the low temperature suction temperature ($T_{sucLT}$) from the low temperature suction temperature sensor 46 and the low temperature discharge temperature ($T_{disLT}$) from the low temperature discharge temperature sensor 50.

At 516, the control algorithm 500 calculates a liquid refrigerant enthalpy for the low temperature and medium temperature compressor racks 16, 20. The liquid refrigerant enthalpy may be calculated as a function of the refrigerant type and the liquid temperature ($T_{liq}$) of the refrigerant exiting the condenser 24. The liquid refrigerant enthalpy may be calculated based on the following equations:

$$h_{Liquid\_LT} = f(\text{refrigerant type}, T_{liqLT}) \quad (19)$$

$$h_{Liquid\_MT} = f(\text{refrigerant type}, T_{liqMT}) \quad (20)$$

If only a single type of compressor rack, such as only a low temperature compressor rack or only a medium temperature compressor rack, is present in the refrigeration system, then only the applicable liquid refrigerant enthalpy for the compressor rack present in the system is calculated.

At 520, the control algorithm 500 calculates the suction gas enthalpy and the suction gas density for the low temperature and medium temperature compressor racks 16, 20. The suction gas enthalpy may be calculated as a function of the refrigerant type, the dew point pressure, and the suction gas temperature. The dew point pressure ($P_{dew}$) may be calculated as a function of the refrigerant type and the suction temperature ($T_{suc}$). The suction gas density may be calculated as a function of the refrigerant type, the dew point pressure ($P_{dew}$), and the suction temperature ($T_{suc}$). The dew point pressure, suction gas enthalpy, and the suction gas density may be calculated based on the following formulas:

$$P_{dew\_LT} = f(\text{refrigerant type}, T_{sucLT}) \quad (21)$$

$$P_{dew\_MT} = f(\text{refrigerant type}, T_{sucMT}) \quad (22)$$

$$h_{Suction\_LT} = f(\text{refrigerant type}, P_{dew\_LT}, T_{sucLT}) \quad (23)$$

$$h_{Suction\_MT} = f(\text{refrigerant type}, P_{dew\_MT}, T_{sucMT}) \quad (24)$$

$$\text{Density}_{Suction_{LT}} = f(\text{refrigerant type}, P_{dew_{LT}}, T_{suc_{LT}}) \quad (25)$$

$$\text{Density}_{Suction_{MT}} = f(\text{refrigerant type}, P_{dew_{MT}}, T_{suc_{MT}}) \quad (26)$$

If only a single type of compressor rack, such as only a low temperature compressor rack or only a medium temperature compressor rack, is present in the refrigeration system, then only the applicable dew point pressure, suction gas enthalpy, and suction gas density for the compressor rack present in the system are calculated.

At 524, the control algorithm 500 calculates a discharge coefficient based on various operational characteristics of the low temperature and medium temperature compressor racks 16, 20. As an example, the discharge coefficient ($\beta$) may be based on at least one of a volumetric efficiency (voleff), a compressor or electrical frequency (freq), a compressor displacement (disp), a compressor speed (RPM), and the suction density calculated. The discharge coefficient may be calculated based on the following formulas:

$$\beta_{LT} = \frac{0.29307 * voleff * freq * disp * RPM * density_{Suction_{LT}}}{1728} \quad (27)$$

$$\beta_{MT} = \frac{0.29307 * voleff * freq * disp * RPM * density_{Suction_{MT}}}{1728} \quad (28)$$

If only a single type of compressor rack, such as only a low temperature compressor rack or only a medium temperature compressor rack, is present in the refrigeration system, then only the applicable discharge coefficient for the compressor rack present in the system is calculated.

At 528, the control algorithm 500 calculates a discharge gas enthalpy based on the discharge coefficient ($\beta$), a unit power of the compressor (power), a compressor isentropic efficiency (iseneff), and the suction gas enthalpy calculated at 520 (Density$_{Suction}$). The discharge gas enthalpy may be calculated using the following formulas:

$$h_{Discharge\_LT} = \frac{power * iseneff}{\beta_{LT}} + h_{Suction\_LT} \quad (29)$$

$$h_{Discharge\_MT} = \frac{power * iseneff}{\beta_{MT}} + h_{Suction\_MT} \quad (30)$$

If only a single type of compressor rack, such as only a low temperature compressor rack or only a medium temperature compressor rack, is present in the refrigeration system, then only the applicable discharge enthalpy for the compressor rack present in the system is calculated.

Additionally or alternatively, the discharge gas enthalpy may be calculated based on a superheat temperature of the liquid refrigerant and/or a subcooling temperature of the liquid refrigerant.

At 532, the control algorithm 500 calculates an actual coefficient of performance (COPactual) based on the enthalpies of each of the low temperature and medium temperature compressor racks 16, 20. In order to determine the COPactual of the low temperature and medium temperature compressor racks 16, 20, the following equations are used:

$$COPactual_{LT} = \frac{h_{Suction\_LT} - h_{Liquid\_LT}}{h_{Discharge\_LT} - h_{Suction\_LT}} \quad (31)$$

$$COPactual_{MT} = \frac{h_{Suction\_MT} - h_{Liquid\_MT}}{h_{Discharge\_MT} - h_{Suction\_MT}} \quad (32)$$

Again, if only a single type of compressor rack, such as only a low temperature compressor rack or only a medium temperature compressor rack, is present in the refrigeration system, then only the applicable COPactual value for the compressor rack present in the system is calculated.

At 536, the control algorithm 500 calculates a Carnot efficiency (COPcarnot) for each of the low and medium temperature refrigeration cases 12, 14. In some embodiments, the temperatures of the low temperature and medium temperature refrigeration cases 12, 14 may be difficult to obtain or unavailable. As such, other temperature measurements, such as indoor and outdoor temperature measurements, may be used in order to calculate the Carnot efficiencies for both the low and medium temperature refrigeration cases 12, 14. As an example, to calculate the Carnot efficiency of each of the low and medium temperature refrigeration cases 12, 14, the following equations are used:

$$COPcarnot_{LT} = \frac{Tindoor}{T_{OAT} - Tindoor} \quad (33)$$

$$COPcarnot_{MT} = \frac{Tindoor}{T_{OAT} - Tindoor} \quad (34)$$

At 540, the control algorithm 500 calculates the SPI for the low and medium temperature refrigeration cases 12, 14 based on the actual coefficient of performance (COPactual) and the Carnot efficiency (COPcarnot) of the low and medium temperature refrigeration cases 12, 14. In order to calculate the SPI, the following equations are used:

$$SPI_{LT} = \frac{COPactual_{LT}}{COPcarnot} \quad (35)$$

$$SPI_{MT} = \frac{COPactual_{MT}}{COPcarnot} \quad (36)$$

If only a single type of refrigeration case, such as only a low temperature refrigeration case or only a medium temperature refrigeration case, is present in the refrigeration system, then only the applicable SPI for the refrigeration case present in the system is calculated.

By comparing the actual coefficient of performance and the Carnot efficiency to obtain the SPI, the control algorithm 500 generates a normalized value of the efficiency of the low and medium temperature refrigeration cases 12, 14. As an example, the SPI may represent an efficiency value that normalizes differences in outdoor ambient air temperatures, the size, and/or the type of each refrigeration system of multiple refrigeration systems.

At 544, the control algorithm 500 determines whether the SPI of one of the low and medium temperature refrigeration cases 12, 14 is greater than a threshold SPI. The threshold SPI represents a minimum level of efficiency that is required for the refrigeration system to properly operate. The threshold SPI may be predetermined, determined by an operator of the refrigeration system, or may be a dynamic value that is configured to update based on the refrigeration system diagnostics or an administrator of the remote computing system. If so, the control algorithm 500 proceeds to 552; otherwise, the control algorithm 400 proceeds to 548.

At 552, the control algorithm 400 indicates that the respective low or medium temperature refrigeration case 12, 14 is operating above the desired efficiency and then proceeds to 556. As an example, the control algorithm 500 may, using the controller 42, provide textual or other visual indications on the user interface 66 that indicate the low or medium temperature refrigeration case 12, 14 is operating above the desired efficiency. At 548, the control algorithm 500 indicates that the respective low or middle temperature compressor case 12, 14 is operating below the desired efficiency and then proceeds to 556. As an example, the control algorithm 500 may, using the controller 42, provide textual or other visual indications on the user interface 66 that indicate the low or medium temperature refrigeration case 12, 14 is operating below the desired efficiency. Additionally or alternatively, the control algorithm 500 may, using the controller, initiate a visual alarm (e.g., an LED status indicator) and/or an auditory alarm (e.g., a beeping tone) that indicates the low or middle temperature compressor case 12, 14 is operating below the desired efficiency. At 556, the control algorithm 500 ends.

Figure 4C:
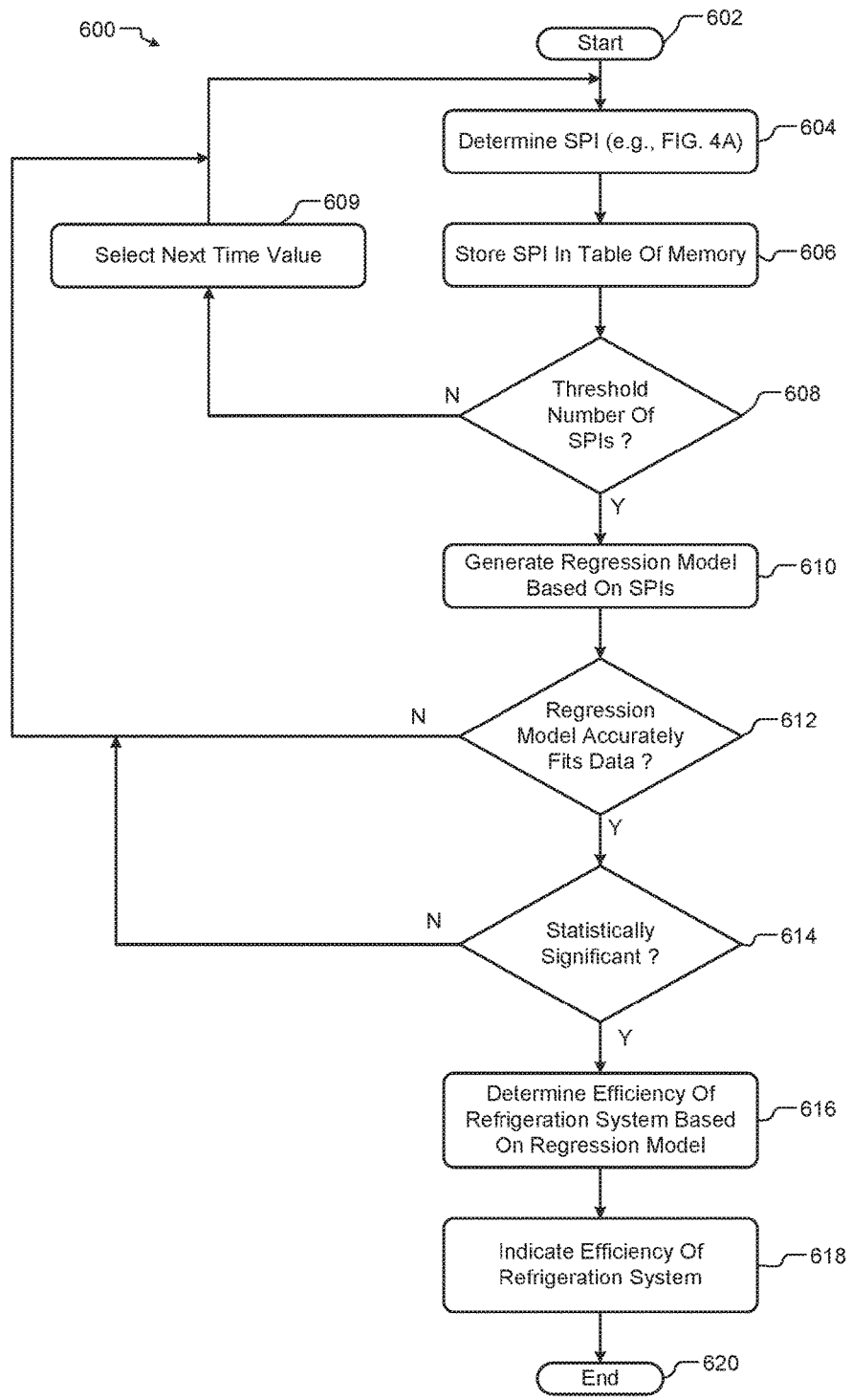

With reference to FIG. 4C, a flowchart for a control algorithm 600 that is configured to determine an efficiency of a refrigeration system based on multiple SPIs of the low and medium temperature compressor racks 16, 20 is shown. The control algorithm 600 starts at 602 when, for example, an operator, using a button or other similar user interface element of the user interface 66, initiates the control algorithm 600. Alternatively, the control algorithm 600 may start at 602 when the controller 42 is powered on, and the controller 42 may be configured to determine the SPI continuously or at predefined intervals of time.

At 604, the control algorithm 600 determines the SPI of the refrigeration system using, for example, the control algorithm 400 described in FIGS. 4A-4B. At 606, the control algorithm 606 stores the SPI in a table of the memory 70. At 608, the control algorithm 600 determines whether a threshold number of SPIs are stored in the table of the memory 70. A threshold number of recorded SPIs may be a minimum number of SPI values needed to generate an accurate regression model, as described below. If so, the control algorithm 600 proceeds to 610; otherwise, the control algorithm 600 proceeds to 609 and selects the next designated time value for which the control algorithm 600 determines the SPI and then proceeds to 604. At 610, the control algorithm 600 generates a regression model based on the multiple SPIs. As an example, the control algorithm 600 may generate a linear regression, a logistic regression, a polynomial regression, a stepwise regression, a nonlinear regression, or other similar regression models.

At 612, the control algorithm 600 determines whether the regression model accurately fits the data. As an example, the control algorithm 600 may determine an R-squared value, which is a statistical measure of how close the regression model fits the data, to evaluate the accuracy of the regression model. Additionally or alternatively, the control algorithm 600 may generate an adjusted R-squared value and/or a predicted R-squared value to evaluate the accuracy of the regression model. If the regression model indicates a negative relationship and the R-squared value is below a first threshold value (e.g., $R^2 < -0.9$), the control algorithm 600 may determine that the regression model accurately fits the data. Additionally or alternatively, if the regression model indicates a positive relationship and the R-squared value is above a second threshold value (e.g., $R^2 > 0.9$), the control algorithm 600 may determine the regression model accurately fits the data. Furthermore, the control algorithm 600 may also evaluate residual values of the regression model to ensure that the regression model is not inaccurate due to, for example, heteroskedasticity and serial correlation. In response to determining the regression model accurately fits the data, the control algorithm 600 proceeds to 614; otherwise, the control algorithm 600 proceeds to 604.

At 614, the control algorithm 600 determines whether the regression model is statistically significant and thereby is an accurate reflection of a hypothetical SPI at any moment in time. As an example, the control algorithm 600 may perform an analysis of variance (ANOVA) of the regression model to generate an F-statistic. The control algorithm 600 may then determine a p-value based in part on the F-statistic. Then, the control algorithm 600 may determine whether a statistically significant relationship exists between the variables of the regression model (i.e., time and SPI) based on a threshold p-value (e.g., p=0.05). In response to the control algorithm 600 at 614 determining the regression model is statistically significant, the control algorithm proceeds to 616; otherwise, the control algorithm proceeds to 604.

At 616, the control algorithm 600 determines the efficiency of the refrigeration system based on the regression model. As an example, the control algorithm 600 may compare the regression model to a standard and/or expected time versus SPI graph of the respective refrigeration system. If the regression model at a first instance in time deviates from the time versus SPI graph at a corresponding time by a predetermined error threshold, the control algorithm 600 may determine that the refrigeration system is operating below a desired efficiency; otherwise, the control algorithm 600 may determine the refrigeration system is operating at or above the desired efficiency. As another example, the control algorithm 600 may predict when the refrigeration system will operate below the desired efficiency based on the regression model and, therefore, provide a date and/or time when the respective refrigeration system needs to be serviced.

In addition to above examples, the control algorithm 600 may compare the regression model to location and/or time data of the refrigeration system in determining the efficiency of the refrigeration system. As an example, the control algorithm 600 may evaluate whether a correlation exists between a location and/or time data and unexpected deviations from the standard and/or expected time versus SPI graph of the respective refrigeration system. Therefore, an operator may determine that certain common characteristics of the refrigeration systems at these locations are causing the unexpected deviations from the standard and/or expected time versus SPI graph of the respective refrigeration systems.

At 618, the control algorithm 600 indicates the efficiency of the refrigeration system. As an example, the control algorithm 600 may, using the controller 42, provide textual or other visual indications on the user interface 66 that indicate the refrigeration system is operating at less than, equal to, or greater than the desired efficiency. Additionally or alternatively, the control algorithm 600 may, using the controller 42, initiate a visual alarm (e.g., an LED status indicator) and/or an auditory alarm (e.g., a beeping tone) that indicates the refrigeration system is operating at less than, equal to, or greater than the desired efficiency. At 620, the control algorithm 600 ends.

Figure 5:
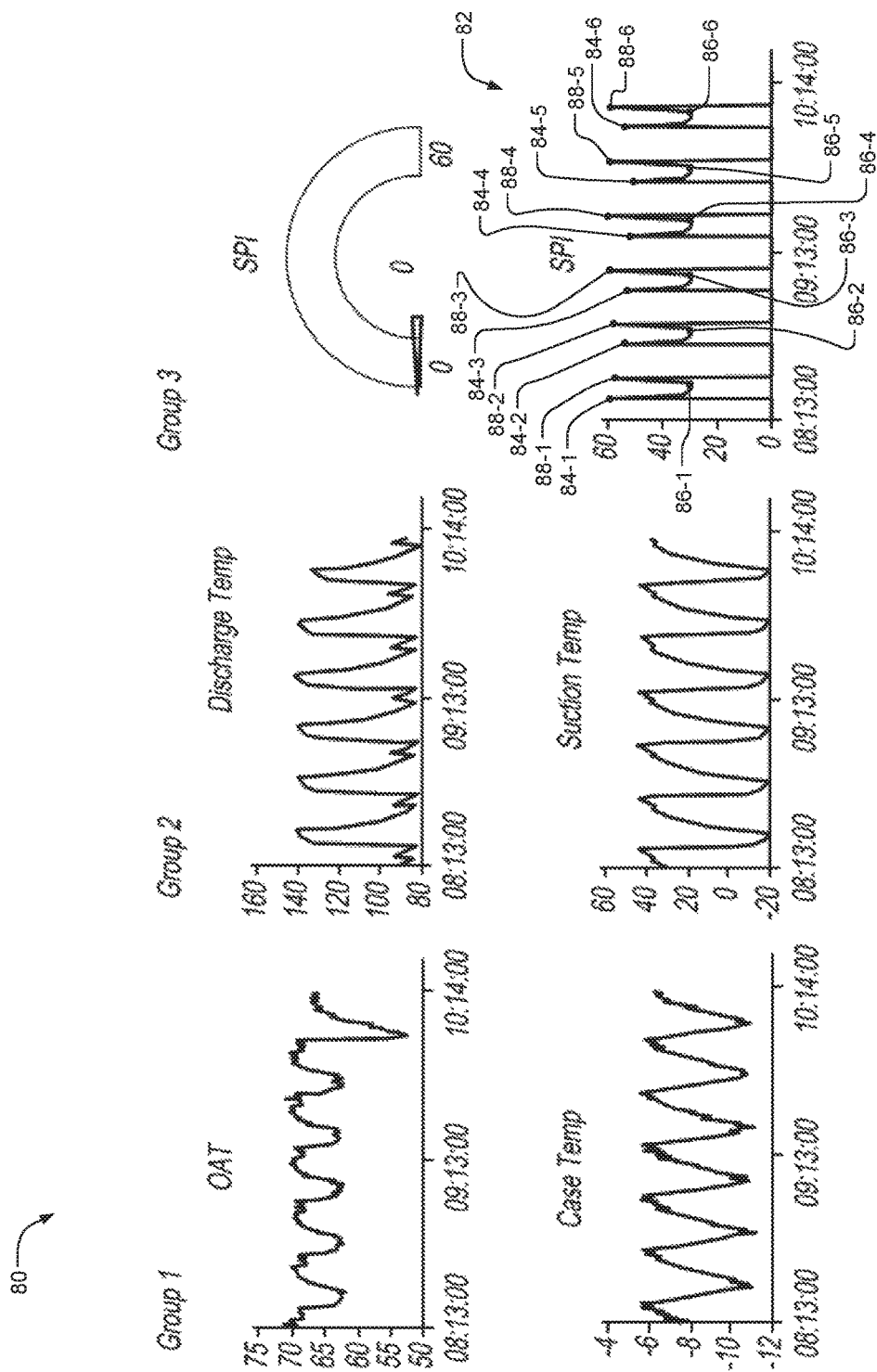
FIGS. 5-9 illustrate example system performance index interfaces according to the present disclosure.

With reference to FIG. 5, a screenshot 80 of an example user interface of the SPI is shown. The screenshot 80 may be displayed on the user interface 66 before the operator initiates the calculation of the dynamic coefficient of performance (i.e., SPI) and when the compressor (e.g., one of the first compressors 18 or one of the second compressors 22) is off. As shown in FIG. 4, the SPI is initially at 0 before the operator initiates the calculation of the SPI. In addition to displaying the SPI, the user interface 66 may display the outdoor air temperature (OAT), the discharge temperature, the case temperature, and the suction temperature of one of the low and medium temperature compressor racks 16, 20, as shown in screenshot 80.

In response to initiating the SPI calculations and as shown in SPI trace 82, the SPI may reach ON peak values 84-1, 84-2, 84-3, 84-4, 84-5, 84-6 (collectively referred to as ON peak value 84) when the compressor is on. Once the SPI has reached the ON peak value 84, the SPI may gradually decrease towards steady-state values 86-1, 86-2, 86-3, 86-4, 86-5, 86-6 (collectively referred to as steady-state value 86). Once the compressor is turned off, the SPI may reach OFF peak values 88-1, 88-2, 88-3, 88-4, 88-5, 88-6 (collectively referred to as OFF peak value 88). Accordingly, the controller 42 may include an algorithm that is configured to filter the ON peak value 84 and the OFF peak value 88 from the SPI calculation. Furthermore, the algorithm may be configured to calculate the SPI based on an average SPI of a set of the filtered SPI's, wherein the set of filtered SPI's is selected from SPI values calculated between the ON peak value 84 and the steady-state value 86.

Additionally, the suction temperatures and discharge temperatures shown in the screenshot 80 may also indicate when a compressor is being turned on/off. For example, when a compressor is turned on, the discharge temperature increases and the suction temperature of the respective compressor may decrease. As another example, when a compressor is turned off, the discharge temperature decreases and the suction pressure of the respective compressor may increase.

Figure 6:
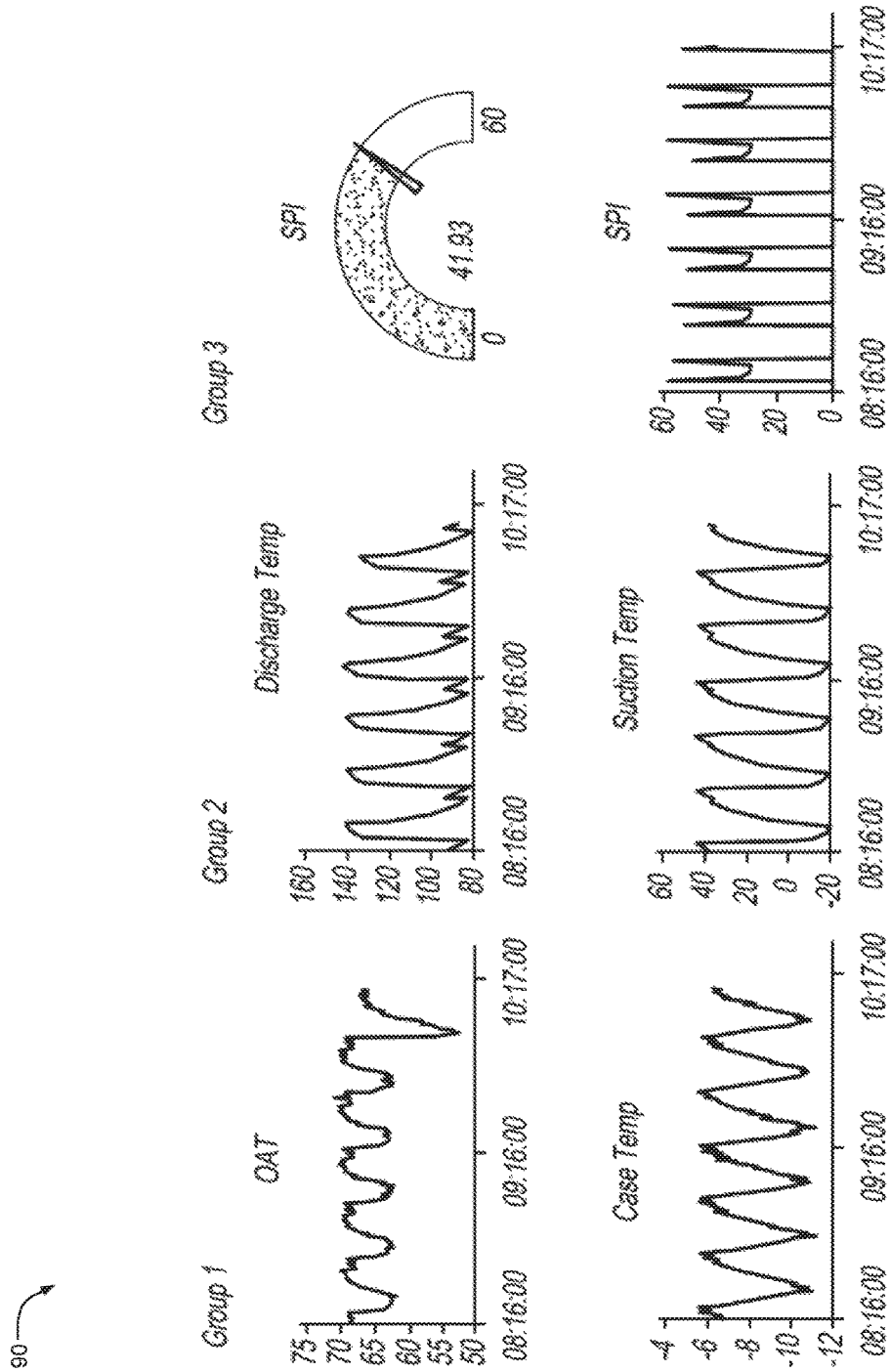

With reference to FIG. 6, a screenshot 90 of an example user interface of the SPI is shown. The screenshot 90 may be displayed on the user interface 66 in response to the operator initiating the calculation of the dynamic coefficient of performance (i.e., SPI) and when the compressor is on. As shown in FIG. 5, the current measurement of the SPI is 30.89, and the displayed SPI may be configured to continuously update in response to a change in the calculated SPI. Additionally, the displayed SPI may be configured to display a color indicating whether it is above the threshold SPI (e.g., yellow corresponds to the SPI being below the threshold SPI, and green corresponds to the SPI being at or above the threshold SPI). In addition to displaying the SPI, the user interface 66 may display the outdoor air temperature (OAT), the discharge temperature, the case temperature, and the suction temperature of one of the low and medium temperature compressor racks 16, 20, as shown in screenshot 90.

Figure 7:
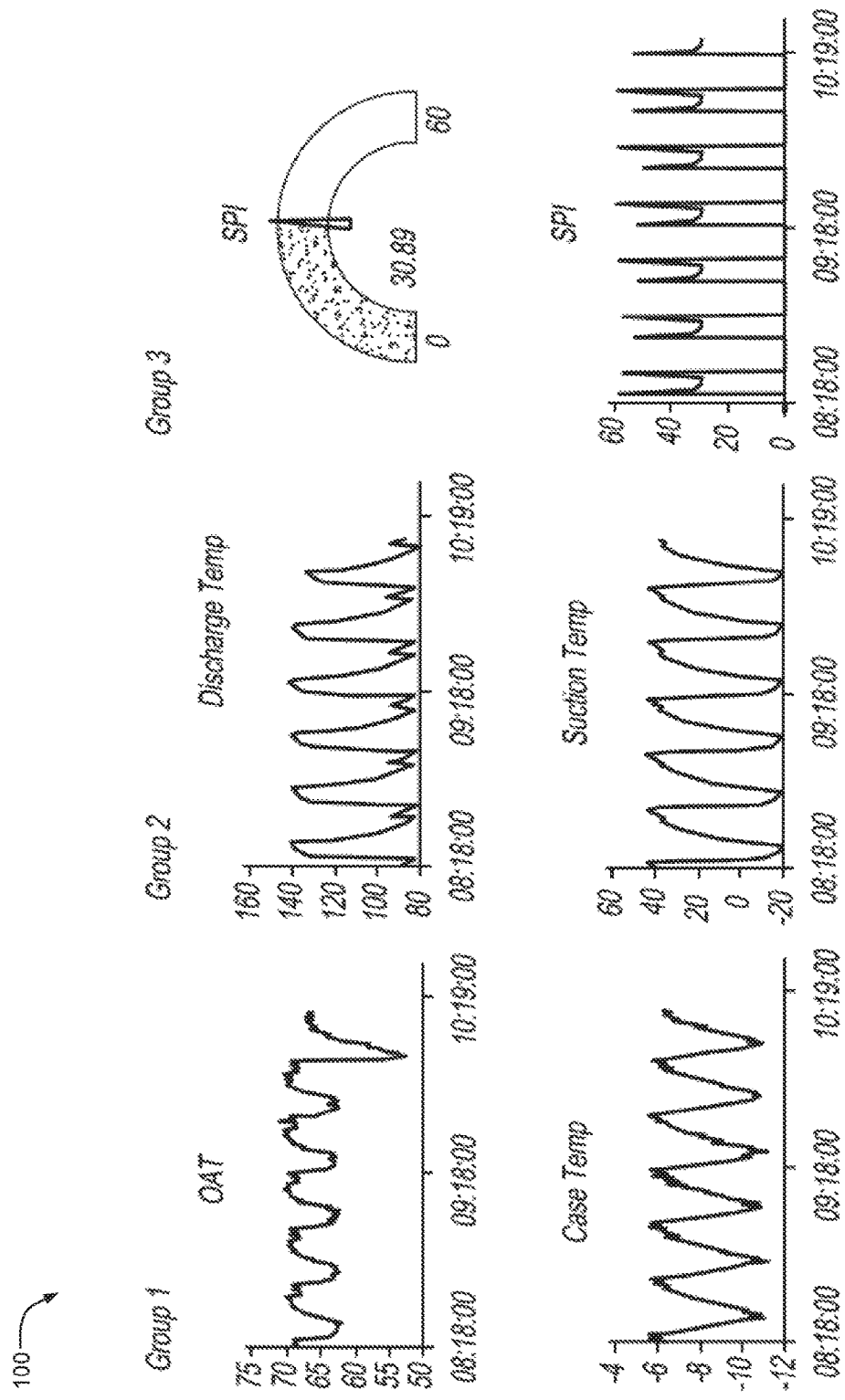

With reference to FIG. 7, a screenshot 100 of an example user interface of the SPI is shown. The screenshot 100 may be displayed on the user interface 66 in response to the operator initiating the calculation of the dynamic coefficient of performance (i.e., SPI) and when the compressor is on. As shown in FIG. 6, the current measurement of the SPI is 41.93, and the displayed SPI may be configured to continuously update in response to a change in the calculated SPI. Additionally, the displayed SPI may be configured to display a color indicating whether it is above the threshold SPI (e.g., yellow corresponds to the SPI being below the threshold SPI, and green corresponds to the SPI being at or above the threshold SPI). In addition to displaying the SPI, the user interface 66 may display the outdoor air temperature (OAT), the discharge temperature, the case temperature, and the suction temperature of one of the low and medium temperature compressor racks 16, 20, as shown in screenshot 100.

Figure 8:
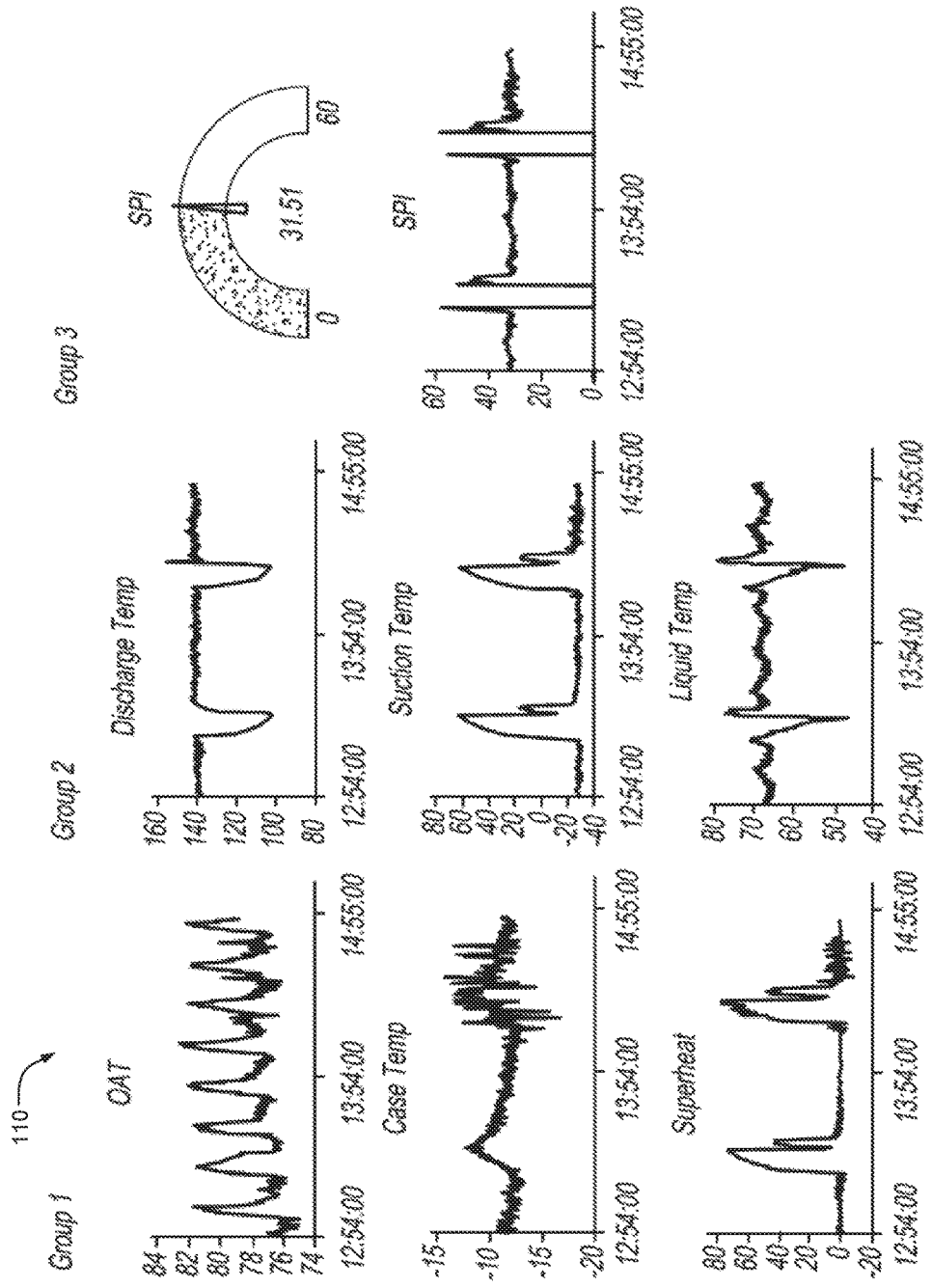

With reference to FIG. 8, a screenshot 110 of an example user interface of the SPI is shown. This embodiment is similar to the embodiments described in FIGS. 6-7, but in this embodiment, the user interface 66 displays a temperature of the liquid refrigerant and a superheat of the refrigerant, which is the difference between the actual temperature of the refrigerant vapor and the saturation temperature of the refrigerant at the same point.

Figure 9:
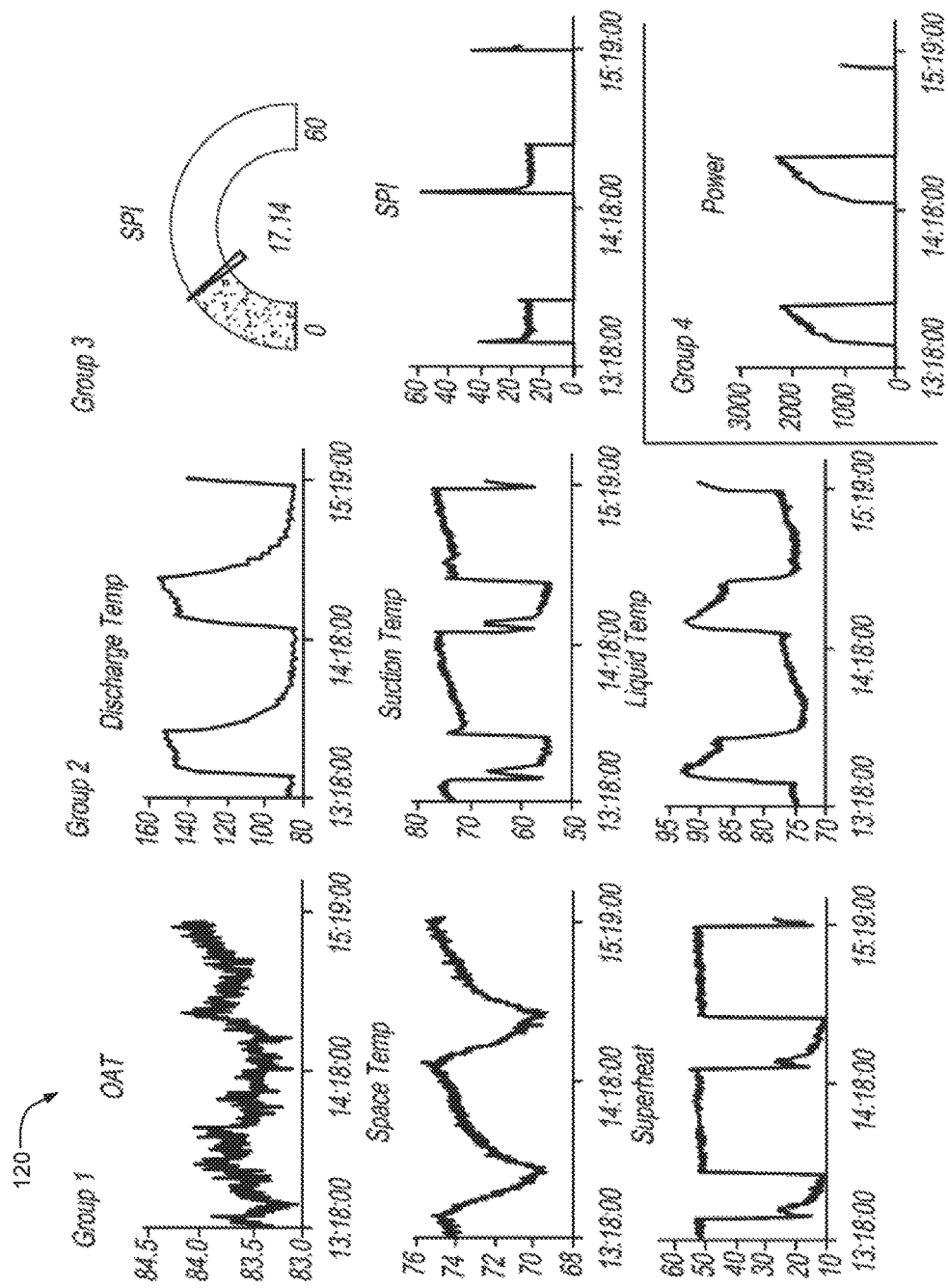

With reference to FIG. 9, a screenshot 120 of an example user interface of the SPI is shown. This embodiment is similar to the embodiments described in FIGS. 6-8, but in this embodiment, the user interface 66 also displays a power consumption of the refrigeration system.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A refrigeration system comprising:
a refrigeration case that includes an evaporator;
a compressor rack associated with the refrigeration case; and
a controller that is configured to, using a processor, execute instructions that are stored in a non-transitory memory, wherein the instructions include:
receiving outdoor temperature data and refrigeration case temperature data from a plurality of temperature sensors;
receiving pressure data of the compressor rack from a pressure sensor;
calculating a weighted Carnot efficiency of the refrigeration case based on (i) the outdoor temperature data, (ii) the refrigeration case temperature data, (iii) a case load of the refrigeration case, and (iv) a case defrost status of the refrigeration case;
calculating a weighted coefficient of performance based on based on (i) a refrigerant type, (ii) the case load of the refrigeration case, (iii) the case defrost status of the refrigeration case, and at least one of the of (iv) the refrigeration case temperature data and (v) the pressure data;
calculating a system performance index (SPI) for the refrigeration case based on the weighted Carnot efficiency of the refrigeration case and weighted actual Carnot efficiency; and
generating, in response to the SPI being below a threshold, an output indicating that the refrigeration case is operating below a threshold efficiency.

2. The refrigeration system of claim 1, wherein instructions include calculating at least one enthalpy for the refrigeration case based on a refrigerant type and at least one of the of the refrigeration case temperature data and the pressure data.

3. The refrigeration system of claim 2, wherein the at least one enthalpy includes a suction gas enthalpy, a liquid refrigerant enthalpy, and a discharge gas enthalpy.

4. The refrigeration system of claim 3, wherein the suction gas enthalpy is based on the refrigerant type, a suction pressure of the refrigeration case, and a suction gas temperature of the compressor rack.

5. The refrigeration system of claim 3, wherein the liquid refrigerant enthalpy is based on the refrigerant type and a liquid temperature of refrigerant exiting a condenser of the refrigeration system.

6. The refrigeration system of claim 3, wherein the discharge gas enthalpy is based on the refrigerant type, a discharge pressure, and a discharge temperature.

7. The refrigeration system of claim 2, wherein the instructions include calculating an actual Carnot efficiency based on the temperature data.

8. The refrigeration system of claim 1, wherein the instructions include calculating a Carnot efficiency based on the outdoor temperature data and the refrigeration case temperature data.

9. The refrigeration system of claim 1, wherein the instructions include calculating an adjusted case load of the evaporator based on the case defrost status of the evaporator and the case load of the evaporator.

10. The refrigeration system of claim 1, wherein the instructions include calculating the weighted Carnot efficiency of the refrigeration case based on a Carnot efficiency of the refrigeration case and an adjusted case load of the evaporator.

11. The refrigeration system of claim 1, wherein instructions include calculating the weighted coefficient of performance based on an actual Carnot efficiency and an adjusted case load of the evaporator.

12. The refrigeration system of claim 1, wherein the instructions include:
generating a regression model based on a plurality of SPIs; and
generating, in response to the regression model being below an error threshold at a first instance of time, an output indicating that the refrigeration case is operating below a threshold efficiency.

13. A method for calculating an efficiency of a refrigeration case of a refrigeration system, wherein the refrigeration case includes an evaporator, and the refrigeration system includes a compressor rack associated with the refrigeration case, the method comprising:
receiving, using a processor, outdoor temperature data and refrigeration case temperature data from a plurality of temperature sensors;
receiving, using the processor, pressure data of the compressor rack from a pressure sensor;
calculating, using the processor and based on instructions stored in a non-transitory memory, a weighted Carnot efficiency of the refrigeration case based on (i) the outdoor temperature data, (ii) the refrigeration case temperature data, (iii) a case load of the refrigeration case, and (iv) a case defrost status of the refrigeration case;
calculating, using the processor and based on instructions stored in the non-transitory memory, a weighted coefficient of performance based on based on (i) a refrigerant type, (ii) the case load of the refrigeration case, (iii) the case defrost status of the refrigeration case, and at least one of the of (iv) the refrigeration case temperature data and (v) the pressure data;
calculating using the processor and based on instructions stored in the non-transitory memory, a system performance index (SPI) for the refrigeration case based on the weighted Carnot efficiency of the refrigeration case and weighted actual Carnot efficiency; and
generating, using the processor and in response to the SPI being below a threshold, an indication that the refrigeration case is operating below a threshold efficiency.

14. The method of claim 13 further comprising calculating at least one enthalpy for the refrigeration case based on a refrigerant type and at least one of the of the refrigeration case temperature data and the pressure data.

15. The method of claim 14, wherein calculating the at least one enthalpy includes calculating a suction gas enthalpy, a liquid refrigerant enthalpy, and a discharge gas enthalpy.

16. The method of claim 15, wherein the suction gas enthalpy is based on the refrigerant type, a suction pressure of the refrigeration case, and a suction gas temperature of the compressor rack.

17. The method of claim 15, wherein the liquid refrigerant enthalpy is based on the refrigerant type and a liquid temperature of refrigerant exiting a condenser.

18. The method of claim 15, wherein the discharge gas enthalpy is based on the refrigerant type, a discharge pressure, and a discharge temperature.

19. The method of claim 14 further comprising calculating an actual Carnot efficiency based on the temperature data.

20. The method of claim 13 further comprising calculating a Carnot efficiency based on the outdoor temperature data and the refrigeration case temperature data.

21. The method of claim 13 further comprising calculating an adjusted case load of the evaporator based on the case defrost status of the evaporator and the case load of the evaporator.

22. The method of claim 13 further comprising calculating the weighted Carnot efficiency of the refrigeration case based on a Carnot efficiency of the refrigeration case and an adjusted case load of the evaporator.

23. The method of claim 13 further comprising calculating the weighted coefficient of performance based on an actual Carnot efficiency and an adjusted case load of the evaporator.

24. The method of claim 13 further comprising:
generating a regression model based on a plurality of SPIs; and
generating, in response to the regression model being below an error threshold at a first instance of time, an output indicating that the refrigeration case is operating below a threshold efficiency.

* * * * *